(12) United States Patent
Yorimoto et al.

(10) Patent No.: US 8,836,992 B2
(45) Date of Patent: Sep. 16, 2014

(54) IMAGE FORMING APPARATUS, METHOD OF ADJUSTING IMAGE POSITIONAL DEVIATION, AND COMPUTER PROGRAM PRODUCT

(71) Applicants: Mamoru Yorimoto, Kanagawa (JP); Tatsuhiko Okada, Kanagawa (JP); Yuichi Sakurada, Tokyo (JP); Daisaku Horikawa, Kanagawa (JP); Makoto Moriwaki, Kanagawa (JP)

(72) Inventors: Mamoru Yorimoto, Kanagawa (JP); Tatsuhiko Okada, Kanagawa (JP); Yuichi Sakurada, Tokyo (JP); Daisaku Horikawa, Kanagawa (JP); Makoto Moriwaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/098,071

(22) Filed: Dec. 5, 2013

(65) Prior Publication Data

US 2014/0153006 A1    Jun. 5, 2014

(30) Foreign Application Priority Data

Dec. 5, 2012 (JP) ................................. 2012-265919
Oct. 18, 2013 (JP) ................................. 2013-216933
Dec. 4, 2013 (JP) ................................. 2013-250855

(51) Int. Cl.
| | |
|---|---|
| G06F 15/00 | (2006.01) |
| H04N 1/00 | (2006.01) |
| G06K 15/02 | (2006.01) |
| G06K 15/10 | (2006.01) |
| H04N 1/024 | (2006.01) |
| G06K 1/00 | (2006.01) |
| G06K 15/00 | (2006.01) |

(52) U.S. Cl.
CPC ....... *H04N 1/00002* (2013.01); *H04N 1/00127* (2013.01); *G06K 15/027* (2013.01); *G06K 15/102* (2013.01); *H04N 1/00567* (2013.01); *H04N 1/024* (2013.01)
USPC ............................. 358/1.5; 359/1.1; 359/1.12

(58) Field of Classification Search
USPC ............... 358/1.1, 1.2, 1.4, 1.5, 1.6, 1.9, 501, 358/504, 502, 505, 509, 474
See application file for complete search history.

(56) References Cited

U.S. PATENT DOCUMENTS

| | | | |
|---|---|---|---|
| 7,841,682 B2 | 11/2010 | Yorimoto et al. | |
| 7,854,489 B2 | 12/2010 | Hagiwara et al. | |
| 7,914,096 B2 | 3/2011 | Hagiwara et al. | |
| 7,992,953 B2 | 8/2011 | Yorimoto et al. | |
| 8,042,904 B2 | 10/2011 | Niihara et al. | |
| 8,066,348 B2 | 11/2011 | Hirota et al. | |
| 8,157,342 B2 | 4/2012 | Morino et al. | |
| 8,186,799 B2 | 5/2012 | Morino et al. | |
| 8,308,272 B2 | 11/2012 | Naruse et al. | |

(Continued)

FOREIGN PATENT DOCUMENTS

| | | |
|---|---|---|
| JP | 2008-229915 | 10/2008 |
| JP | 2012-187914 | 10/2012 |

*Primary Examiner* — Thierry L Pham
(74) *Attorney, Agent, or Firm* — Duft Bornsen & Fettig LLP

(57) ABSTRACT

An image forming apparatus forms adjustment patterns having a predetermined edge interval on a recording medium, while moving a carriage mounted with recording heads that eject a liquid droplet on the recording medium and formed of a sub-scanning motor and the like in a main-scanning direction by a main-scanning motor. The image forming apparatus performs a positional deviation correction process in which the adjustment pattern formed on the recording medium is read by a reading sensor mounted on the recording heads, while moving the carriage in the main-scanning direction, to correct a positional deviation of a landing position of the liquid droplet ejected from the recording heads based on an ideal interval between the adjustment patterns and a read result of the reading sensor repeatedly at least twice.

7 Claims, 20 Drawing Sheets

(56) References Cited

U.S. PATENT DOCUMENTS

| | | |
|---|---|---|
| 8,414,105 B2 | 4/2013 | Komuro et al. |
| 8,425,006 B2 | 4/2013 | Mase et al. |
| 8,529,012 B2 | 9/2013 | Yorimoto et al. |
| 2008/0225066 A1 | 9/2008 | Yorimoto et al. |
| 2008/0231649 A1 | 9/2008 | Kawabata et al. |
| 2009/0189937 A1 | 7/2009 | Naruse et al. |
| 2010/0066781 A1 | 3/2010 | Niihara et al. |
| 2010/0225693 A1 | 9/2010 | Sakurada et al. |
| 2010/0231632 A1 | 9/2010 | Kobayashi et al. |
| 2011/0063352 A1 | 3/2011 | Sakurada et al. |
| 2011/0134187 A1 | 6/2011 | Naruse et al. |
| 2011/0199410 A1 | 8/2011 | Mase et al. |
| 2011/0228027 A1 | 9/2011 | Okada et al. |
| 2011/0298854 A1 | 12/2011 | Sakurada et al. |
| 2012/0218336 A1 | 8/2012 | Okada et al. |
| 2012/0218340 A1 | 8/2012 | Horikawa et al. |
| 2012/0218568 A1 | 8/2012 | Yorimoto et al. |
| 2012/0229546 A1 | 9/2012 | Okada et al. |
| 2013/0027457 A1 | 1/2013 | Yamazaki et al. |

IMAGE FORMING APPARATUS

X AXIS: POSITION IN MAIN-SCANNING DIRECTION
(BLACK: REFERENCE PATTERN,
HATCHED PORTION: PATTERN TO BE MEASURED)

READ LIGHT SPOT

FIG.13
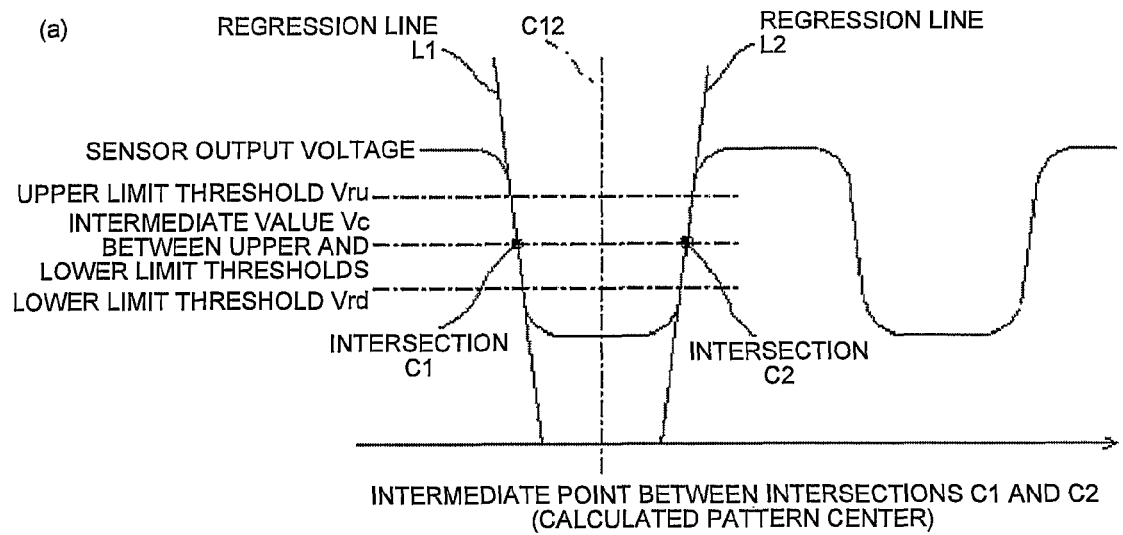
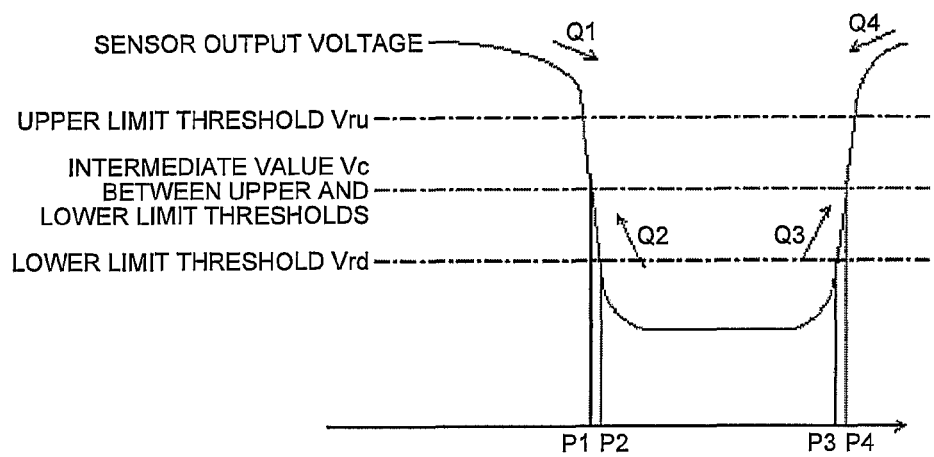

IMAGE FORMING APPARATUS, METHOD OF ADJUSTING IMAGE POSITIONAL DEVIATION, AND COMPUTER PROGRAM PRODUCT

CROSS-REFERENCE TO RELATED APPLICATIONS

The present application claims priority to and incorporates by reference the entire contents of Japanese Patent Application No. 2012-265919 filed in Japan on Dec. 5, 2012, Japanese Patent Application No. 2013-216933 filed in Japan on Oct. 18, 2013, and Japanese Patent Application No. 2013-250855 filed in Japan on Dec. 4, 2013.

BACKGROUND OF THE INVENTION

1. Field of the Invention

The present invention relates to an image forming apparatus, a method of adjusting an image positional deviation, and a computer program product.

2. Description of the Related Art

As an image forming apparatus such as a printer, a facsimile machine, a copying machine, and a multifunction peripheral having functions of these machines, conventionally, for example, there is a liquid-ejection type image forming apparatus that ejects liquid droplets such as ink to a recording medium to record an image. The liquid-ejection type image forming apparatus can use various materials, for example, paper, thread, fiber, fabric, leather, metal, plastic, glass, wood, and ceramic as the recording medium. Herein, it is simply referred to as "recording medium" for easy understanding. As a liquid used for recording an image, various liquids such as ink can be used. In the following explanations, it is referred to as "liquid" or "liquid droplet" to clarify the explanations.

Such a liquid-ejection type image forming apparatus generally moves a sheet intermittently in a sub-scanning direction (a conveying direction), and reciprocates a carriage mounted with a recording head that ejects liquid droplets in a main-scanning direction, thereby recording an image on the sheet.

The liquid-ejection type image forming apparatus forms an image by ejecting the liquid droplets in both outward and homeward directions of the carriage to improve the image forming speed.

However, in the liquid-ejection type image forming apparatus, when an image is formed in both the outward and homeward directions of the carriage, a deviation of landing positions of the liquid droplets ejected from the recording head mounted on the carriage to the recording medium occurs in the outward and homeward directions, thereby causing a problem such that image deterioration occurs. Particularly, when image formation is for ruled lines or the like, deterioration of image quality due to the positional deviation is conspicuous.

Therefore, conventionally, in an image forming apparatus that includes a recording head that ejects liquid droplets and forms an image on a recording medium being conveyed, there has been proposed an image forming apparatus provided with a pattern forming unit that forms a reference pattern formed by a plurality of independent liquid droplets and a pattern to be measured, which is formed by a plurality of independent liquid droplets ejected under an ejection condition different from that of the reference pattern, on a water repellent member having water repellency next to each other in a scanning direction of the recording head, a reading unit including a light-emitting unit that irradiates light to the respective patterns and a light-receiving unit that receives regularly reflected light from the respective patterns, and a correction unit that measures a distance between the respective patterns based on a read result of the reading unit to correct a liquid-droplet ejection timing of the recording head based on a measurement result thereof (see Japanese Patent Application Laid-open No. 2008-229915).

The image forming apparatus that performs such correction of the liquid-droplet ejection timing conventionally measures a time after a pattern reading sensor reads the reference pattern until the pattern reading sensor reads the pattern to be measured, to detect a positional deviation of landing positions by a difference between the measured time and a normal time. Accordingly, a positional deviation adjustment is performed with higher accuracy than positional detection by a main-scanning encoder.

However, in the case of this calculation method, because the actual read rate is not constant due to sine fluctuations of a high frequency occurring in the carriage speed mounted with the reading sensor, a calculated value of positional deviation includes an error in the read rate.

Conventionally, therefore, a pattern in which the reference pattern and the pattern to be measured are arranged so that the pitch thereof becomes an integral multiple of a carriage fluctuation cycle is adopted in order to cancel a carriage-speed fluctuation component.

However, in the conventional technique described in Japanese Patent Application Laid-open No. 2008-229915, the reference pattern and the pattern to be measured, which is formed by liquid droplets ejected under an ejection condition different from that of the reference pattern, are used as the pattern. However, such a state may occur that a positional deviation adjustment value for aligning the positions of the pattern to be measured and the reference pattern is not correct. In this case, the read rates (phases of the read rate) of the reference pattern and the pattern to be read do not match with each other. Therefore, an error due to the rate fluctuations is not balanced out, thereby causing an error from a logical read-rate calculation value by an amount of phase shifting. As a result, the positional deviation may not be adjusted accurately.

Therefore, there is a need for an image forming apparatus and a method of adjusting a positional deviation that are capable of improving accuracy of positional deviation adjustment even if a positional deviation adjustment value is not correct.

SUMMARY OF THE INVENTION

According to an embodiment, an image forming apparatus includes a conveying unit, a movable body, a movable-body drive unit, an adjustment-pattern recording controller, a reading unit, a calculator, a correction unit, and an ejection timing adjustment unit. The conveying unit conveys a recording medium. The movable body includes a recording head to eject a liquid droplet for image recording to the recording medium, and is supported movably in a main-scanning direction orthogonal to a conveying direction of the recording medium. The movable-body drive unit moves the movable body in the main-scanning direction. The adjustment-pattern recording controller is configured to cause a plurality of adjustment patterns to be recorded with a predetermined edge interval in the main-scanning direction by causing the liquid droplet ejected from the recording head to land on the recording medium, while causing the movable-body drive unit to move the movable body in the main-scanning direction. The reading unit is mounted on the movable body to irradiate the recording medium on which the adjustment patterns are recorded with read light and read the adjustment patterns by photoelectrically converting reflected light from the recording medium. The calculator is configured to calculate a positional deviation correction amount for correcting a deviation of a landing position of the liquid droplet, which is ejected from the recording head and landed on the recording medium, based on an ideal interval between the adjustment patterns recorded on the recording medium and a read result of the adjustment patterns read by the reading unit. The correction unit is configured to cause the adjustment-pattern recording controller to record the adjustment pattern at a recording position where the interval between the adjustment patterns becomes an integral multiple of a fluctuation cycle in a relative movement of the reading unit and the adjustment pattern, which is caused by movement of the movable body mounted with the reading unit, and correct the recording position of the adjustment pattern based on the positional deviation correction amount calculated by the calculator. The ejection timing adjustment unit is configured to adjust an ejection timing of the liquid droplet by the recording head by performing repeatedly at least twice a recording process of the adjustment pattern on the recording medium by the adjustment-pattern recording controller, a reading process of the adjustment patterns by the reading unit, a calculation process of the positional deviation correction amount by the calculator, and a correction process of the recording position of the adjustment pattern by the correction unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is an explanatory diagram of an edge-position specifying method;

DETAILED DESCRIPTION OF THE PREFERRED EMBODIMENTS

Exemplary embodiments of the present invention will be explained below in detail with reference to the accompanying drawings. Although these embodiments are given various technically preferred limitations because these are exemplary embodiments, the scope of the invention is not disadvantageously limited to the following explanations, and not all of constituent elements explained in the following embodiments are necessarily essential constituent elements of the present invention.

Figure 1:
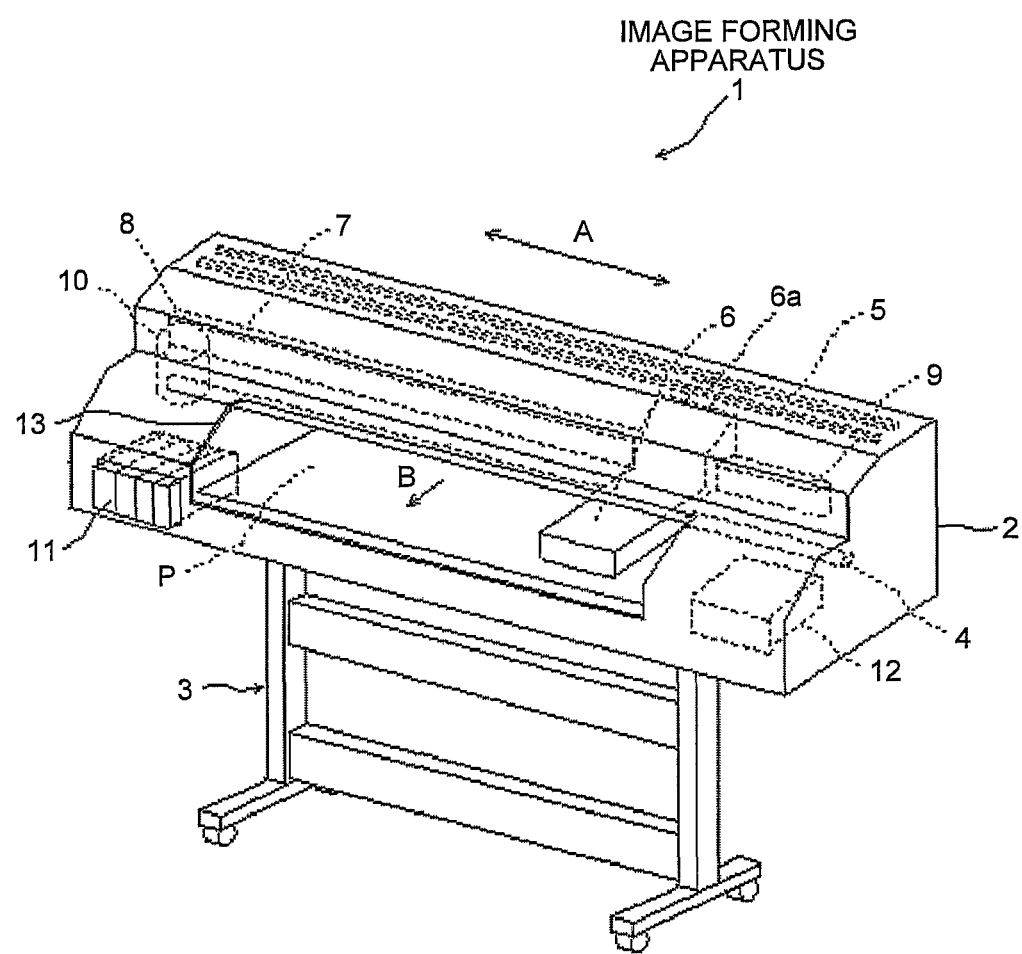
FIG. 1 is a schematic perspective view of an image forming apparatus applying an embodiment of the present invention.

FIGS. 1 to 23 depict an image forming apparatus, a method of adjusting an image positional deviation, and a program for adjusting an image positional deviation according to an embodiment of the present invention. FIG. 1 is a schematic perspective view of an image forming apparatus 1 having applied thereto an embodiment of the image forming apparatus, the method of adjusting an image positional deviation, and the program for adjusting an image positional deviation according to the present invention.

In FIG. 1, the image forming apparatus 1 is a serial liquid-ejection type (an ink-ejection type) image forming apparatus, and a body casing 2 is arranged on a body frame 3. In the body casing 2 of the image forming apparatus 1, a main-guide rod 4 and a sub-guide rod 5 are extended in a main-scanning direction shown by a double-headed arrow A in FIG. 1. The main-guide rod 4 movably supports a carriage 6, and the carriage 6 is provided with a coupling piece 6a that engages with the sub-guide rod 5 to stabilize the posture of the carriage 6.

In the image forming apparatus 1, an endless-belt type timing belt 7 is arranged along the main-guide rod 4, and the timing belt 7 is extended between a drive pulley 8 and a driven pulley 9. The drive pulley 8 is rotated by a main-scanning motor 10, and is arranged in a state of applying a predetermined tension to the timing belt 7. The drive pulley 8 is rotated by the main-scanning motor 10 to rotate and move the timing belt 7 in the main-scanning direction according to a rotation direction of the drive pulley 8.

Figure 2:
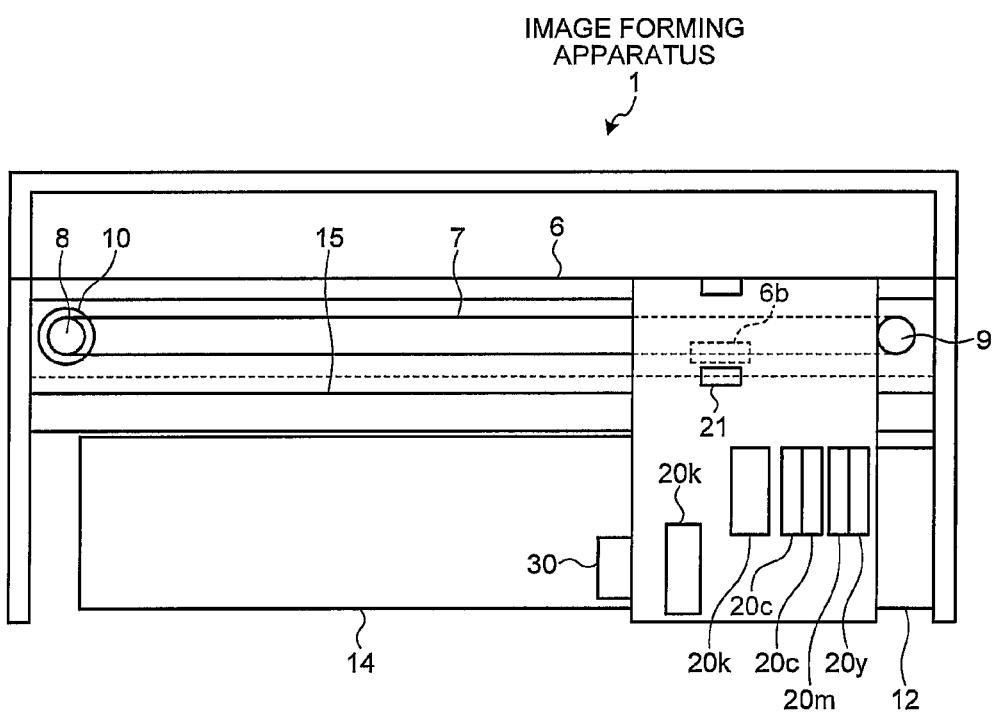
FIG. 2 is a plan view of a carriage portion.

The carriage 6 is coupled to the timing belt 7 by a belt holding unit 6b (see FIG. 2). Because the timing belt 7 is rotated and moved in the main-scanning direction by the drive pulley 8, the carriage 6 reciprocates in the main-scanning direction along the main-guide rod 4.

In the image forming apparatus 1, a cartridge unit 11 and a maintenance mechanical unit 12 are housed respectively at positions at opposite ends in the main-scanning direction in the body casing 2. The cartridge unit 11 houses cartridges that respectively house each liquid (ink) of yellow (Y), magenta (M), cyan (C), and black (K) replaceably. The respective cartridges in the cartridge unit 11 are connected to recording heads 20y, 20m, 20c, and 20k (see FIG. 2) of the corresponding color of a recording head 20 mounted on the carriage 6 by a pipe (not shown). The respective cartridges supply liquid to the recording heads 20y, 20m, 20c, and 20k via the pipe. In the following explanations, the recording heads 20y, 20m, 20c, and 20k are collectively referred to as "recording head 20".

As described later, the image forming apparatus 1 ejects liquid to a recording medium P conveyed intermittently in a sub-scanning direction orthogonal to the main-scanning direction (the direction indicated by an arrow B in FIG. 1) on a platen 14 (see FIG. 2), while moving the carriage 6 in the main-scanning direction, thereby recording and outputting an image on the recording medium P.

That is, the image forming apparatus 1 according to the present embodiment intermittently conveys the recording medium P in the sub-scanning direction, moves the carriage 6 in the main-scanning direction while conveyance of the recording medium P in the sub-scanning direction is stopped, and ejects liquid onto the recording medium P on the platen 14 from a nozzle array of the recording heads 20y, 20m, 20c, and 20k to form an image on the recording medium P.

The maintenance mechanical unit 12 performs cleaning of an ejection surface of the recording head 20, capping, ejection of non-required liquid, and the like, thereby ejecting the non-required liquid from the recording head 20 and maintaining reliability of the recording head 20.

In the image forming apparatus 1, a cover 13 is provided so that a conveyed portion of the recording medium P can be opened and closed. At the time of maintenance of the image forming apparatus 1 or occurrence of paper jam, a maintenance work inside the body casing 2, a removal work of the jammed recording medium P, and the like can be performed by opening the cover 13.

As shown in FIG. 2, the carriage (movable body) 6 mounts the recording heads 20y, 20m, 20c, and 20k. The recording heads 20y, 20m, 20c, and 20k are respectively coupled to the cartridge of the corresponding color of the cartridge unit 11 by the pipe, and eject liquid of the corresponding color onto the recording medium P opposite thereto. That is, the recording head 20y ejects yellow (Y) liquid, the recording head 20m ejects magenta (M) liquid, the recording head 20c ejects cyan (C) liquid, and the recording head 20k ejects black (K) liquid, respectively.

The recording head 20 is mounted on the carriage 6 with the ejection surface (a nozzle surface) thereof facing downward in FIG. 1 (the side of the recording medium P), to eject liquid onto the recording medium P.

In the image forming apparatus 1, an encoder sheet 15 is arranged over at least a moving range of the carriage 6 parallel to the timing belt 7, that is, parallel to the main-guide rod 4. An encoder sensor 21 that reads the encoder sheet 15 is fitted to the carriage 6. The image forming apparatus 1 controls drive of the main-scanning motor 10 based on a read result of the encoder sheet 15 by the encoder sensor 21, thereby controlling the movement of the carriage 6 in the main-scanning direction.

The main-guide rod 4 and the sub-guide rod 5 are spanned between side plates 2 on the right and left sides of the body casing 2 and fixed thereto.

As shown in FIG. 2, in the recording head 20 mounted on the carriage 6, the respective recording heads 20y, 20m, 20c, and 20k are formed in an array of a plurality of nozzles, and eject liquid from the nozzle array onto the recording medium P conveyed on the platen 14 to form an image on the recording medium P. In the image forming apparatus 1, the upstream recording head 20 and the downstream recording head 20 are mounted on the carriage 6 to ensure a sufficient width of the image that can be formed on the recording medium P by one scanning of the carriage 6 and to improve the black printing speed.

A reading sensor (reading unit) 30 is fitted to the carriage 6. The reading sensor 30 reads an adjustment pattern T (see FIGS. 5, 8, 9, and the like) recorded on the recording medium P at the time of performing an image positional deviation adjustment described later.

In the reading sensor 30, a light emitting element 31 and a light receiving element 32 are fixed inside a holder 33, and a lens 34 is provided in an emitting part of read light from the light emitting element 31 and an incident part to the light receiving element 32. The light emitting element 31 and the light receiving element 32 are arranged in parallel in the sub-scanning direction (the conveying direction of the recording medium P) orthogonal to the main-scanning direction. As a result, the reading sensor 30 can detect the adjustment pattern T in a state with the influence of the moving speed fluctuations of the carriage 6 being decreased.

The holder 33 is fixed at a position on a side surface of the carriage 6 aligned with the black (K) recording head 20k mounted on the carriage 6 in the main-scanning direction.

The reading sensor 30 is for adjusting an image positional deviation of the recording head 20k, and it is desired to mount different reading sensors at positions respectively aligned with other recording heads 20y to 20c in the main-scanning direction for adjusting an image positional deviation of the recording heads 20y to 20c. However, when a moving mechanism that slides and moves the reading sensor 30 between a position aligned with the recording head 20k in the main-scanning direction and positions respectively aligned with the recording heads 20y to 20c in the main-scanning direction is provided, the image forming apparatus 1 can adjust a positional deviation of all the recording heads 20y, 20m, 20c, and 20k by using only one reading sensor 30. Alternatively, by conveying the recording medium P on which the adjustment pattern T is formed by the recording heads 20y, 20m, and 20c to the position of the reading sensor 30 in a counter-conveying direction, the image forming apparatus 1 can adjust a positional deviation of all the recording heads 20y, 20m, 20c, and 20k by using only one reading sensor 30.

In the reading sensor 30, a light emitting element, which is comparatively simple and inexpensive and emits visible light, such as an LED (Light Emitting Diode) is used as the light emitting element 31, and a photo sensor is used as the light receiving element 32. Furthermore, a detection range of a spot diameter d (see FIG. 9) of a read light spot Y by the light emitting element 31 on the recording medium P is in the order of millimeters (mm), in order to reduce the production cost of the image forming apparatus 1 by using an inexpensive lens instead of using a lens having high accuracy as the lens 34.

Figure 3:
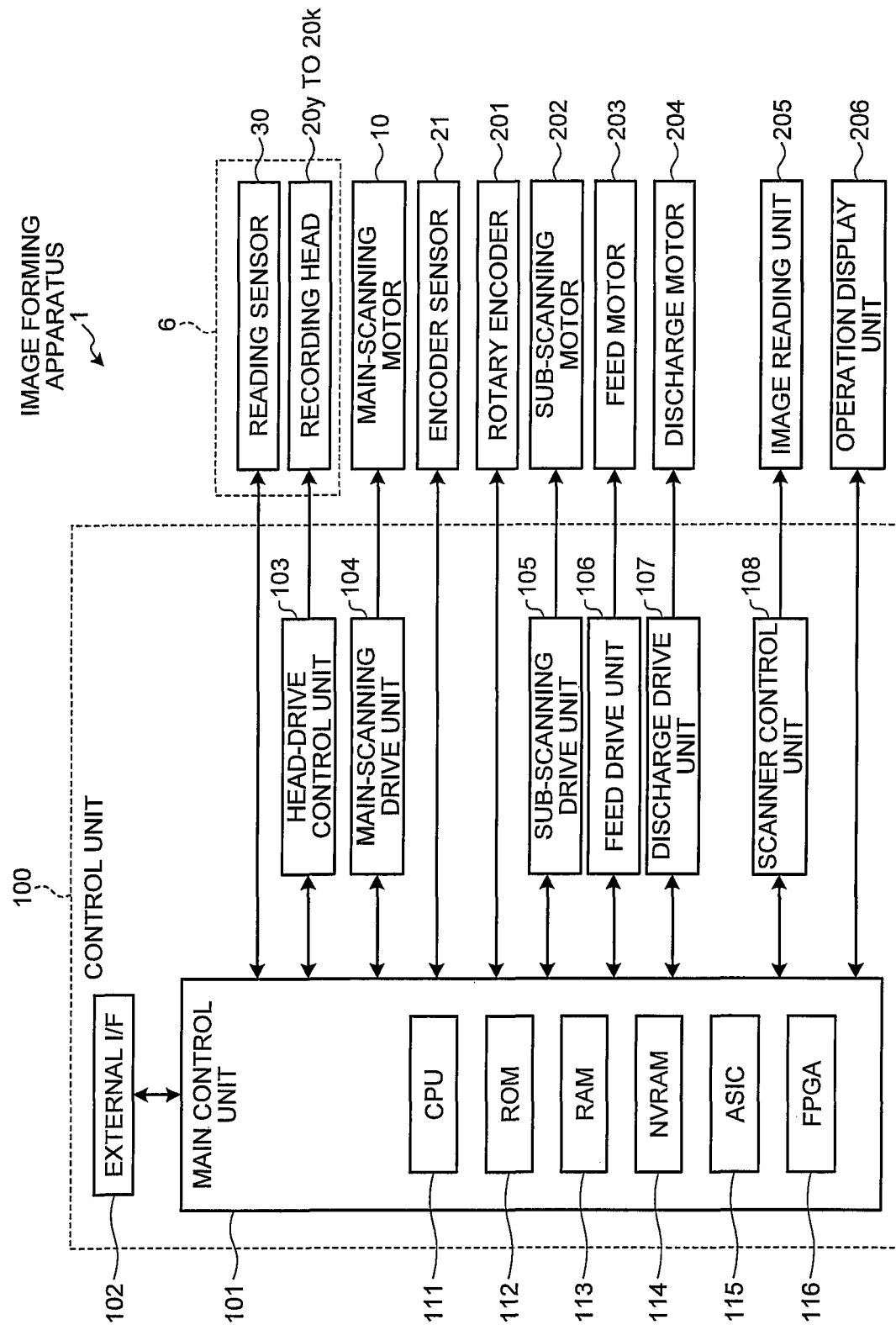
FIG. 3 is a block configuration diagram of relevant parts of the image forming apparatus.

The image forming apparatus 1 is configured as shown in a block diagram of FIG. 3, and includes a control unit 100, the carriage 6 mounted with the reading sensor 30 and the recording heads 20y to 20k, the main-scanning motor 10, the encoder sensor 21, a rotary encoder 201, a sub-scanning motor 202, a feed motor 203, a discharge motor 204, an image reading unit 205, an operation display unit 206, and the like. Other than the above elements, although not shown, the image forming apparatus 1 also includes a maintenance recovery motor that drives the maintenance mechanical unit 12, a recovery-system drive unit for driving the drive motor, a solenoids drive unit that drives various types of solenoids, a clutch drive unit that drives electromagnetic clutches, and the like. Furthermore, although not shown, in the image forming apparatus 1, detection signals and the like of other various sensors are also input to the main control unit 101.

The control unit 100 includes the main control unit 101, an external I/F 102, a head-drive control unit 103, a main-scanning drive unit 104, a sub-scanning drive unit 105, a feed drive unit 106, a discharge drive unit 107, a scanner control unit 108, and the like. The main control unit 101 has a CPU (Central Processing Unit) 111, a ROM (Read Only Memory) 112, a RAM (Random Access Memory) 113, an NVRAM (Non-Volatile Random Access Memory) 114, an ASIC (Application Specific Integrated Circuit) 115, an FPGA (Field Programmable Gate Array) 116, and the like.

The main control unit 101 stores therein programs such as a basic program as the image forming apparatus 1 and the program for adjusting an image positional deviation of the present invention, and required data in the ROM 112. The main control unit 101 uses the RAM 113 as a work memory to control respective units of the image forming apparatus 1 based on the programs in the ROM 112, performs basic processes as the image forming apparatus 1, and performs an image positional deviation adjustment process of the present invention described later.

Pieces of data to be memorized even at the time of power off of the image forming apparatus 1 are stored in the NVRAM 114 under control of the CPU 111 and is read.

The ASIC 115 performs signal processing and image processing such as sorting with respect to the image data, and the FPGA 116 processes input/output signals for controlling the entire image forming apparatus 1.

That is, the image forming apparatus 1 is configured as an image forming apparatus that reads the program for adjusting an image positional deviation that executes the method of adjusting an image positional deviation of the present invention, which is recorded on a computer-readable recording medium such as a ROM, an EEPROM (Electrically Erasable and Programmable Read Only Memory), an EPROM, a flash memory, a flexible disk, a CD-ROM (Compact Disc Read Only Memory), a CD-RW (Compact Disc Rewritable), a DVD (Digital Versatile Disk), an SD (Secure Digital) card, and an MO (Magneto-Optical Disc), to introduce the program into the ROM 112 or the like, thereby executing the method of adjusting an image positional deviation for accurately adjusting an image positional deviation of a formed image described later. The program for adjusting an image positional deviation is a computer-executable program described in legacy programming languages such as Assembler, C, C++, C#, and Java®, object-oriented programming languages, or the like, and can be stored in the recording medium and distributed.

In the present embodiment, the CPU 111 mainly performs the image positional deviation adjustment process. However, an LSI (Large Scale Integration) such as the FPGA 116 and the ASIC 115 can perform a part or whole of the image positional deviation adjustment process. In the following explanations, it is assumed that the main control unit 101 including these units performs the image positional deviation adjustment process.

The external I/F 102 functions as a communication interface between other devices and the main control unit 101 by network such as a LAN (Local Area Network) or a communication line such as an exclusive line, and transmits data from external devices to the main control unit 101. Furthermore, the external I/F 102 outputs data generated by the main control unit 101 to the external devices. The external I/F 102 can be fitted with a detachable recording medium, and a program can be provided in a state with the program being stored in the recording medium or distributed via an external communication apparatus.

The head-drive control unit (adjustment-pattern recording control unit) 103 controls the presence of liquid ejected respectively from the recording heads 20y to 20k, and a liquid-droplet ejection timing and an ejection amount at the time of ejection, and causes the recording heads 20y to 20k to record an image on the recording medium P. The head-drive control unit 103 has an ASIC (a head driver) for converting a head data generation array in order to control drive of the recording heads 20y to 20k, generates a drive signal indicating the presence and size of the liquid droplet, and supplies the drive signal to the recording heads 20y to 20k. The recording heads 20y to 20k respectively have a switch for each nozzle of the recording heads 20y to 20k, and cause the liquid droplet having the specified size to land at a position on the recording medium P specified by the printing data, by turning on/off based on the drive signal. A head driver of the head-drive control unit 103 can be provided on the side of the recording heads 20y to 20k, or the head-drive control unit 103 and the recording heads 20y to 20k can be integrally formed. Furthermore, the head-drive control unit 103 controls the drive of the recording heads 20y to 20k and causes the recording heads 20y to 20k to record the adjustment pattern T described later on the recording medium P as an image.

The main-scanning drive unit (a motor driver) 104 drives the main-scanning motor 10 that moves the carriage 6 in the main-scanning direction to scan under control of the main control unit 101. Therefore, the main-scanning drive unit 104 and the main-scanning motor 10 function as a movable-body drive unit as a whole.

A read result signal from the encoder sensor 21 that reads the encoder sheet 15 is input to the main control unit 101, and the main control unit 101 detects the position of the carriage 6 in the main-scanning direction based on the read result signal. The main control unit 101 then controls drive of the main-scanning motor 10 via the main-scanning drive unit 104, thereby causing the carriage 6 to reciprocate to an intended position in the main-scanning direction.

The sub-scanning drive unit (a motor driver) 105 drives the sub-scanning motor 202 that conveys the recording medium P.

A detection signal (a pulse) from the rotary encoder 201 that detects the rotation of the sub-scanning motor 202 is input to the main control unit 101. The main control unit 101 detects a travel distance of the recording medium P, that is, a medium feed amount in the sub-scanning direction based on the detection signal, and controls conveyance of the recording medium P via a carrier roller (not shown) by controlling drive of the sub-scanning motor 202 via the sub-scanning drive unit 105. Therefore, the sub-scanning drive unit 105, the sub-scanning motor 202, and the carrier roller (not shown) function as a conveying unit that conveys the recording medium P as a whole.

The feed drive unit 106 drives the feed motor 203 that feeds the recording medium P from a feed tray (not shown).

The discharge drive unit 107 drives the discharge motor 204 that drives a discharge roller for discharging the printed (image-formed) recording medium P to a discharge tray (not shown). The sub-scanning drive unit 105 can be used instead of the discharge drive unit 107.

The scanner control unit 108 controls a drive operation of the image reading unit 205. As the image reading unit 205, for example, an image scanner or the like using a CCD (Charge Coupled Device) or a CMOS (Complementary Metal Oxide Semiconductor) is used. The image reading unit 205 scans a document to read a document image with a predetermined resolution, and outputs the image to the scanner control unit 108.

The operation display unit 206 includes various keys required for the image forming apparatus 1 to perform various operations, and includes a display (for example, a liquid crystal display) and a lamp such as an LED (Light Emitting Diode). When various operations for causing the image forming apparatus 1 to perform various functional operations are input from operation keys, the operation display unit 206 sends the operation contents to the main control unit 101. The operation display unit 206 also causes the display to display the display information transferred from the main control unit 101, that is, a command content input from the operation keys and various pieces of information to be notified from the image forming apparatus 1 to a user. Particularly, the operation display unit 206 performs various settings required for the image positional deviation adjustment process described later.

The main control unit (calculation unit, correction unit, ejection-timing adjustment unit) 101 drives the recording heads 20$y$ to 20$k$ via the head-drive control unit 103, to form the adjustment pattern T (see FIGS. 4 to 6) on the recording medium P. The main control unit 101 then performs the image positional deviation adjustment process for adjusting an image positional deviation by performing a process of calculating an image positional deviation amount at least twice based on a read result of the adjustment pattern T by the reading sensor 30. For that purpose, the main control unit 101 performs a calculation process, a correction process, and an ejection-timing adjustment process. In the calculation process, a positional deviation correction amount for correcting a deviation of a landing positions of the liquid droplets, which are ejected from the recording heads 20$y$ to 20$k$ and landed on the recording medium P, is calculated based on an interval between the adjustment patterns T (the edge-to-edge distance or center-to-center distance between the adjustment patterns T) recorded on the recording medium P by the head-drive control unit 103 and a read result of the adjustment pattern T by the reading sensor 30. In the correction process, the adjustment pattern T is recorded by the head-drive control unit 103 at a recording position where the interval between the adjustment patterns T becomes an integral multiple of a fluctuation cycle in a relative movement of the reading sensor 30 and the adjustment patterns T, which is caused by movement of the carriage 6 mounted with the reading sensor 30 moved by the movable-body drive unit such as the main-scanning motor 10, and the recording position of the adjustment patterns T is corrected based on the positional deviation correction amount calculated in the calculation process. In the ejection-timing adjustment process, ejection timings of the liquid droplets by the recording heads 20$y$ to 20$k$ are adjusted by performing repeatedly at least twice the recording process of the adjustment patterns T on the recording medium P by the head-drive control unit 103, the reading process of the adjustment patterns T by the reading sensor 30, the calculation process of the positional deviation correction amount, and the correction process of the recording position of the adjustment patterns T. In the present embodiment, the interval between the adjustment patterns T is obtained as an edge-to-edge distance between the adjustment patterns T (a distance between edges). Alternatively, the interval between the adjustment patterns T can be obtained as a distance from the center position of the first adjustment pattern T to the center position of the second adjustment pattern T (a center-to-center distance between the adjustment patterns).

The main control unit 101 adjusts the image positional deviation (a deviation of landing positions) by correcting the liquid-droplet ejection timings of the recording heads 20$y$ to 20$k$.

Figure 4:
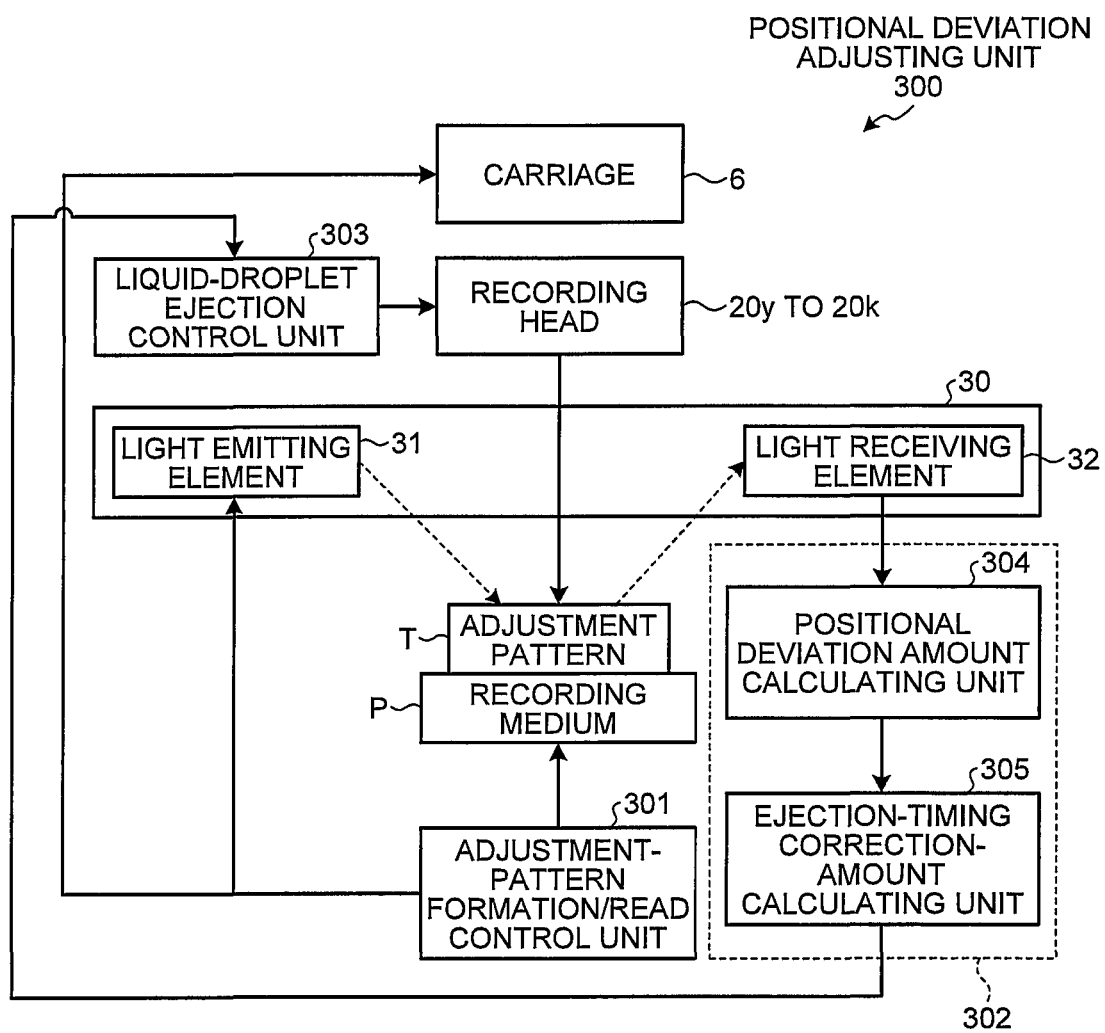
FIG. 4 is a block configuration diagram of an image positional deviation adjusting unit.

In the image forming apparatus 1, by executing the program for adjusting an image positional deviation described above, functional units required for performing the image positional deviation adjustment process is configured as a positional deviation adjusting unit 300 as shown in FIG. 4.

In the positional deviation adjusting unit 300, an adjustment-pattern formation/read control unit 301, a positional deviation correcting unit 302, and a liquid-droplet ejection control unit 303 are constituted mainly by the main control unit 101, and the positional deviation correcting unit 302 includes a positional deviation amount calculating unit 304 and an ejection-timing correction-amount calculating unit 305.

The liquid-droplet ejection control unit (adjustment-pattern recording control unit) 303 is constituted by the main control unit 101, the head-drive control unit 103, and the like. The liquid-droplet ejection control unit 303 drives the recording heads 20$y$ to 20$k$ based on adjustment pattern data provided from the adjustment-pattern formation/read control unit 301 under control of the adjustment-pattern formation/read control unit 301, thereby forming the adjustment pattern T on the recording medium P.

Figure 8:
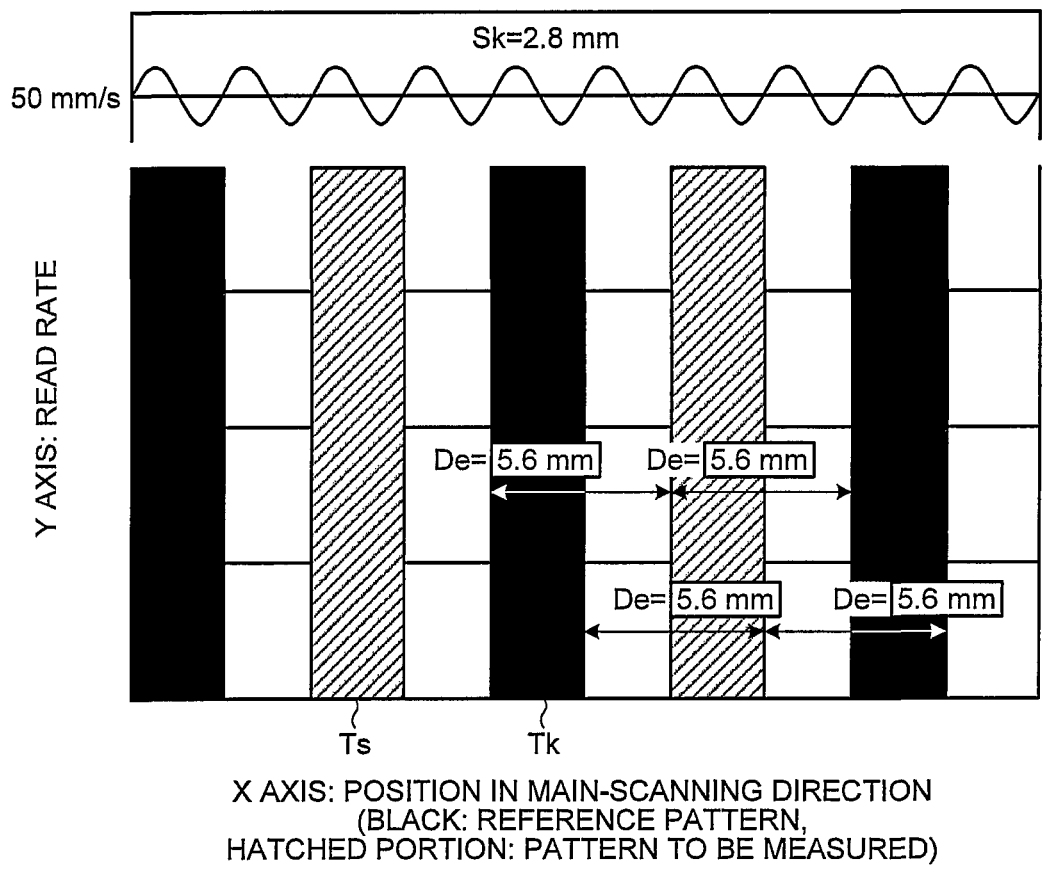
FIG. 8 depicts a positional relation between a read rate and an adjustment pattern.

That is, in the image forming apparatus 1, when an instruction of positional deviation adjustment is issued, the adjustment-pattern formation/read control unit 301 causes the carriage 6 to reciprocate in the main-scanning direction. The adjustment-pattern formation/read control unit 301 causes the recording heads 20$y$ to 20$k$ to eject the liquid droplet to the recording medium P based on the adjustment pattern data via the liquid-droplet ejection control unit 303, while moving the carriage 6, to form the adjustment patterns T on the recording medium P. As shown in FIG. 8, the adjustment patterns T are formed of linear reference patterns Tk and patterns to be measured Ts, each formed by a plurality of independent liquid droplets. The reference patterns Tk are formed under an ejection condition of the liquid drop different from that of the patterns to be measured Ts. For example, when the reference patterns Tk are formed in an outward path of the carriage 6, the patterns to be measured Ts are formed in an inward path of the carriage 6.

Figure 5:
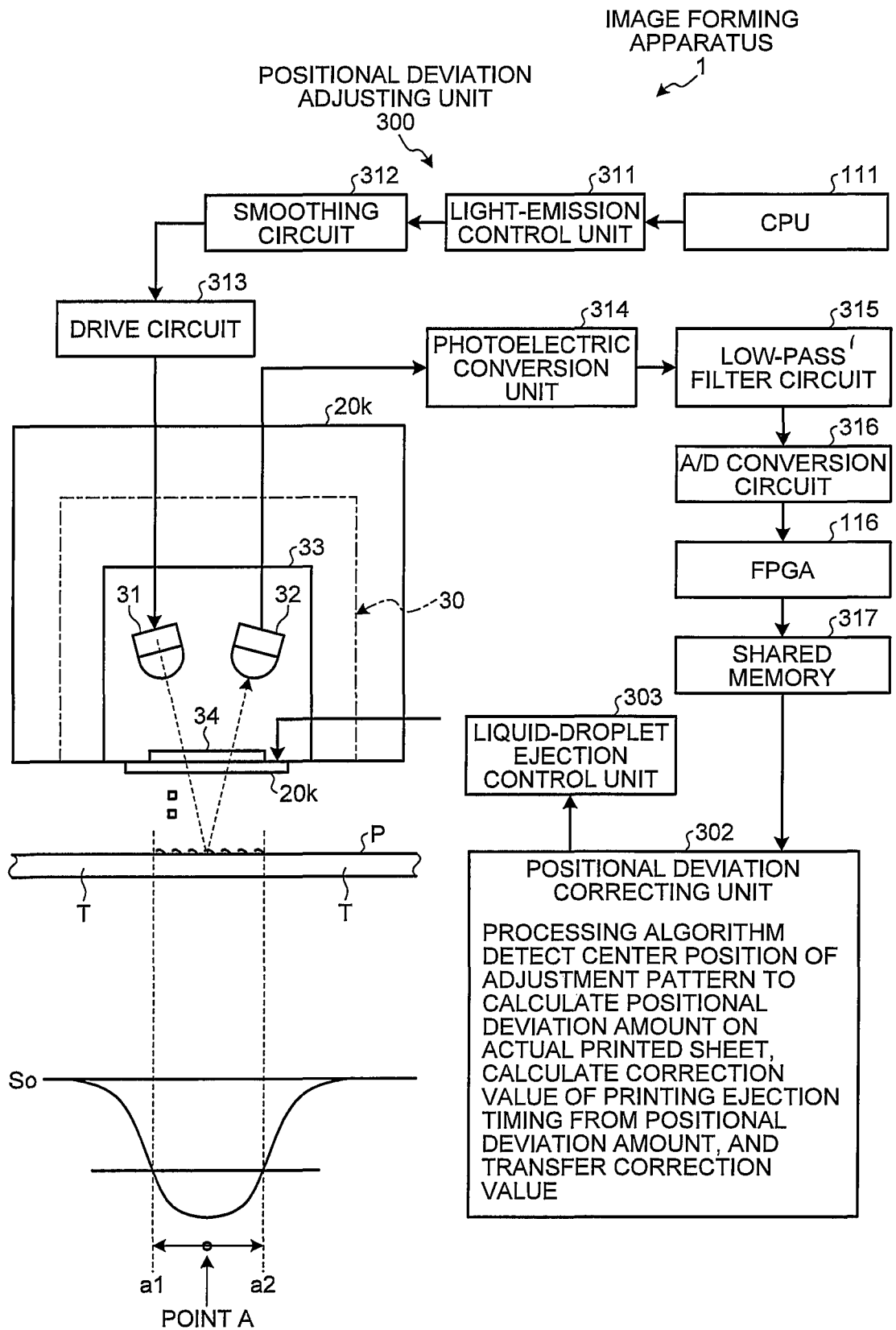
FIG. 5 is a block configuration diagram around the image positional deviation adjusting unit.

In the image forming apparatus 1, the adjustment pattern T is read by the reading sensor 30, while the carriage 6 mounted with the reading sensor 30 is moved in the main-scanning direction under control of the adjustment-pattern formation/read control unit 301. The adjustment-pattern formation/read control unit 301 is constituted by the main control unit 101 and the like. More specifically, as shown in FIG. 5, the adjustment-pattern formation/read control unit 301 is formed of the CPU 111, a light-emission control unit 311, a smoothing circuit 312, a drive circuit 313, a photoelectric conversion unit 314, a low-pass filter circuit 315, an A/D conversion circuit 316, an FPGA 116, and a shared memory 317.

That is, the CPU 111 of the adjustment-pattern formation/read control unit 301 sets a PWM value for driving the light emitting element 31 of the reading sensor 30 in the light-emission control unit 311, while moving the carriage 6 in the main-scanning direction, and the light-emission control unit 311 outputs a light-emission pulse signal having the PWM value to the smoothing circuit 312. The smoothing circuit 312 smoothes the light-emission pulse signal and outputs the smoothed light-emission pulse signal to the drive circuit 313. The drive circuit 313 drives the light emitting element 31 to emit light according to the light-emission pulse signal and irradiate outgoing light from the light emitting element 31 to the recording medium P on which the adjustment pattern T is formed.

In the reading sensor 30, reflected light reflected from the adjustment pattern T enters into the light receiving element 32 by irradiating the outgoing light from the light emitting element 31 to the adjustment pattern T on the recording medium P. The light receiving element 32 outputs an analog detection signal according to a light receiving amount of the reflected light from the adjustment pattern T to the photoelectric conversion unit 314.

The photoelectric conversion unit 314 photoelectrically converts the detection signal input from the light receiving element 32 of the reading sensor 30, and outputs the photoelectrically converted signal (a sensor output voltage) to the low-pass filter circuit 315.

The low-pass filter circuit 315 removes noise from sensor output voltage data and outputs the sensor output voltage data to the A/D conversion circuit 316, and the A/D conversion circuit 316 converts the sensor output voltage data to digital data and outputs the digital data to the FPGA 116.

The FPGA 116 stores the digitally converted sensor output voltage data in the shared memory 317.

In the positional deviation correcting unit 302, the positional deviation amount calculating unit 304 detects the position of the adjustment pattern T based on the output result of the light receiving element 32 of the reading sensor 30 to calculate a deviation amount (a liquid-droplet landing positional deviation amount) thereof with respect to the reference position. The positional deviation correcting unit 302 outputs the calculated landing positional deviation amount (a positional deviation correction amount) to the ejection-timing correction-amount calculating unit 305.

The ejection-timing correction-amount calculating unit 305 calculates a correction amount of the ejection timing at the time of driving the recording heads 20y to 20k by the liquid-droplet ejection control unit 303 so that the landing positional deviation amount becomes "0", and sets the calculated ejection-timing correction amount in the liquid-droplet ejection control unit 303.

At the time of driving the recording heads 20y to 20k based on the ejection-timing correction amount, the liquid-droplet ejection control unit 303 drives the recording heads 20y to 20k after correcting the ejection timing.

The main control unit 101 adjusts the ejection timing of the liquid droplets from the recording heads 20y to 20k by performing the recording process of the adjustment patterns T on the recording medium P performed by the recording heads 20y to 20k, the reading process of the adjustment patterns T performed by the reading sensor 30, the calculation process of the positional deviation amount (the positional deviation correction amount) performed by the positional deviation amount calculating unit 304, and the correction process of the recording position of the adjustment patterns T performed by the ejection-timing correction-amount calculating unit 305 repeatedly at least twice.

Specifically, as shown in FIG. 5, the processing algorithm executed by the positional deviation correcting unit 302 implemented by the main control unit 101 detects the center position (point A) of the adjustment pattern T) from a sensor output voltage So stored in the shared memory 317 as indicated by an arrow in FIG. 5. The CPU calculates the deviation amount of actual landing positions by the heads 20y to 20k relative to the reference position (reference head), calculates the correction amount of the print ejection timing from the deviation amount, and sets the correction amount in the liquid-droplet ejection control unit 303.

The operation of the present embodiment is explained next. The image forming apparatus 1 according to the present embodiment improves accuracy of image positional deviation adjustment.

Figure 6:
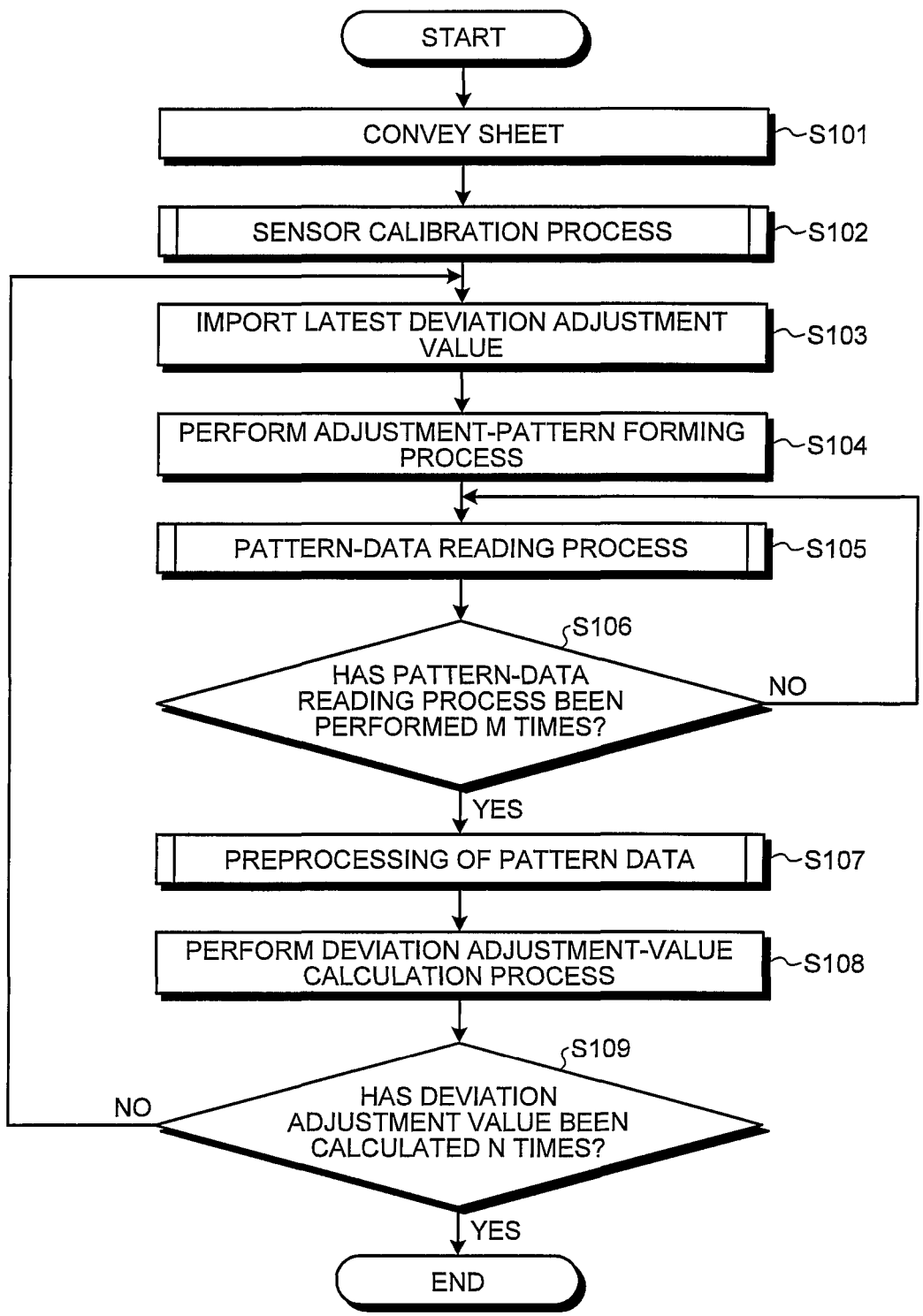
FIG. 6 is a flowchart of an image positional deviation adjustment process.

That is, when an instruction of positional deviation adjustment is issued, e.g., when a preset timing comes or when a user's operation is received through the operation display unit 206, the image forming apparatus 1 performs the image positional deviation adjustment process as shown in FIG. 6.

That is, the image forming apparatus 1 proceeds to the image positional deviation adjustment process, as shown in FIG. 6, the adjustment-pattern formation/read control unit 301 drives the sub-scanning drive unit 105 to convey the recording medium P to a predetermined position (Step S101).

The main control unit 101 performs a calibration process of the reading sensor 30 (Step S102).

Figure 7:
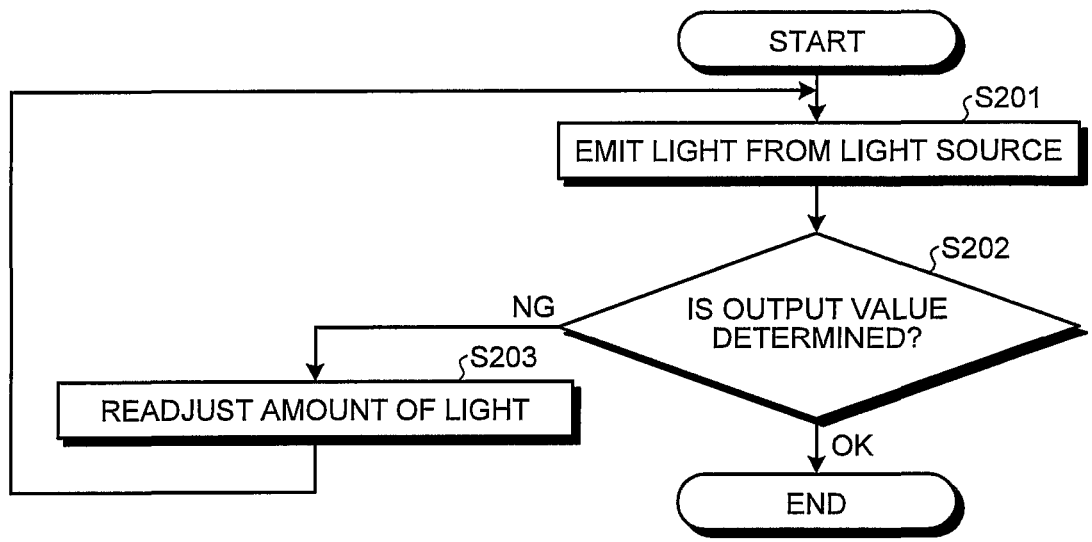
FIG. 7 is a flowchart of a sensor calibration process.

The main control unit 101 performs the calibration process of the reading sensor 30 as shown in FIG. 7.

That is, at the calibration process, the main control unit 101 causes the light emitting element 31 of the reading sensor 30 to emit light with a preset initial light-emission amount (Step S201). Specifically, the main control unit 101 sets the PWM value for emitting light with the initial light-emission amount in the light-emission control unit 311, and the light-emission control unit 311 outputs a light-emission pulse signal having the PWM value to the drive circuit 313 via the smoothing circuit 312. The drive circuit 313 drives the light emitting element 31 to emit light based on the light-emission pulse signal having the PWM value.

When the light emitting element 31 is driven to emit light, the main control unit 101 determines whether a light amount of reflected light from the recording medium P received by the light receiving element 32, that is, an output value of the light receiving element 32 is within a range of a preset specified output value (Step S202). Specifically, for example, the main control unit 101 determines whether the output value of the light receiving element 32 is in a range of 4 V±0.2 V.

When the output value of the light receiving element 32 is not within the specified output value (NG at Step S202), the main control unit 101 resets an output light amount (Step S203). The main control unit 101 performs the process in which the light emitting element 31 is driven to emit light with the reset output value to perform a determination of the output value repeatedly until the output value of the light receiving element 32 becomes within the specified output value (Steps S201 to S203).

When the output value of the light receiving element 32 becomes within the specified output value at Step S202 (OK at Step S202), the main control unit 101 finishes the calibration process.

Referring back to FIG. 6, the main control unit 101 imports the latest positional deviation adjustment value stored in the NVRAM 114 or the like, that is, an ejection timing value (Step S103). The main control unit 101 performs an adjustment-pattern forming process in which the adjustment patterns T are formed on the recording medium P based on the latest positional deviation adjustment value (the ejection timing value) (Step S104).

That is, the main control unit 101 causes the recording heads 20y to 20k to eject the liquid droplet to the recording medium P based on the adjustment pattern data via the liquid-droplet ejection control unit 303, while reciprocating the carriage 6 in the main-scanning direction, thereby forming the adjustment pattern T on the recording medium P.

The adjustment patterns T, as shown in FIG. 8, are formed of the linear reference patterns Tk and the patterns to be measured Ts arranged in parallel in the sub-scanning direction (the conveying direction of the recording medium P). The reference patterns Tk and the patterns to be measured Ts are each formed by a plurality of independent liquid droplets.

The waveform in the upper part of FIG. 8 indicates a cogging cycle (a fluctuation cycle) Sk of the main-scanning motor 10 that moves the carriage 6 mounted with the reading sensor 30, and in the present embodiment, the cogging cycle Sk of the main-scanning motor 10 is 2.8 mm.

Therefore, the main control unit 101 sets adjustment pattern data in which an edge interval De is set to an integral multiple of the cogging cycle Sk, in the present embodiment, set to 5.6 mm, which is two times, in the liquid-droplet ejection control unit 303. The liquid-droplet ejection control unit 303 drives the recording heads 20y to 20k based on the adjustment pattern data, thereby forming the adjustment patterns T including the reference patterns Tk and the patterns to be measured Ts, which have the cycle twice the cogging cycle Sk, on the recording medium P.

In this manner, by setting the edge interval De of the adjustment patterns T to the integral multiple of the cogging cycle Sk, the read rate of the reading sensor 30 at the respective left-end edge positions and right-end edge positions of the reference pattern Tk and the pattern to be measured Ts can be aligned with the phase of speed fluctuation of the reading sensor 30. As a result, the reading sensor 30 can eliminate the influence of the cogging cycle Sk of the main-scanning motor 10 that moves the reading sensor 30 in the main-scanning direction and detect the edges of the reference pattern Tk and the pattern to be measured Ts accurately. The edge interval De of the adjustment patterns T is set to the integral multiple of the cogging cycle Sk here in order to set the interval between the adjustment patterns T to the integral multiple of the cogging cycle Sk. However, as described above, the interval between the center positions of the adjustment patterns T can be set to the integral multiple of the cogging cycle Sk.

Figure 9:
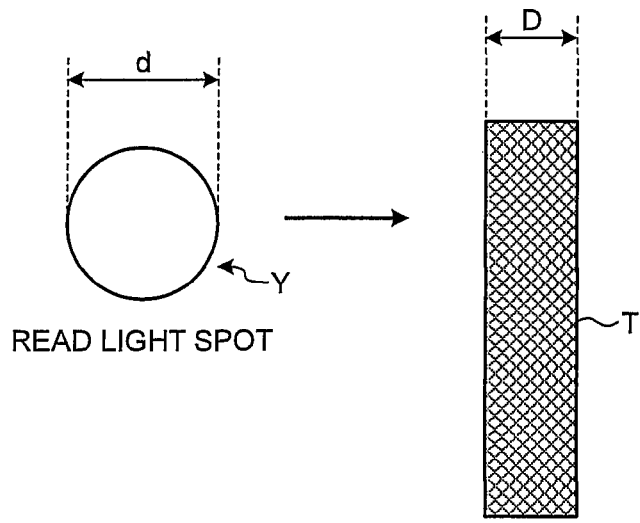
FIG. 9 depicts a relation between a diameter of a read light spot of a reading sensor and a width of the adjustment pattern.

Furthermore, as shown in FIG. 9, the main control unit 101 outputs adjustment pattern data in which a pattern width D of the adjustment pattern T is set to an appropriate width with respect to the spot diameter d of the read light spot Y of the reading sensor 30 on the recording medium P to the liquid-droplet ejection control unit 303. Therefore, as described above, by setting the spot diameter d of the read light spot Y, for example, to the same size as the pattern width D of the adjustment pattern T, the reading sensor 30 can read the adjustment pattern T with the read light having the spot diameter d same as the pattern width D of the adjustment pattern T.

When the adjustment pattern T is formed on the recording medium P as described above, the main control unit 101 performs a pattern-data reading process (Step S105).

Figure 10:
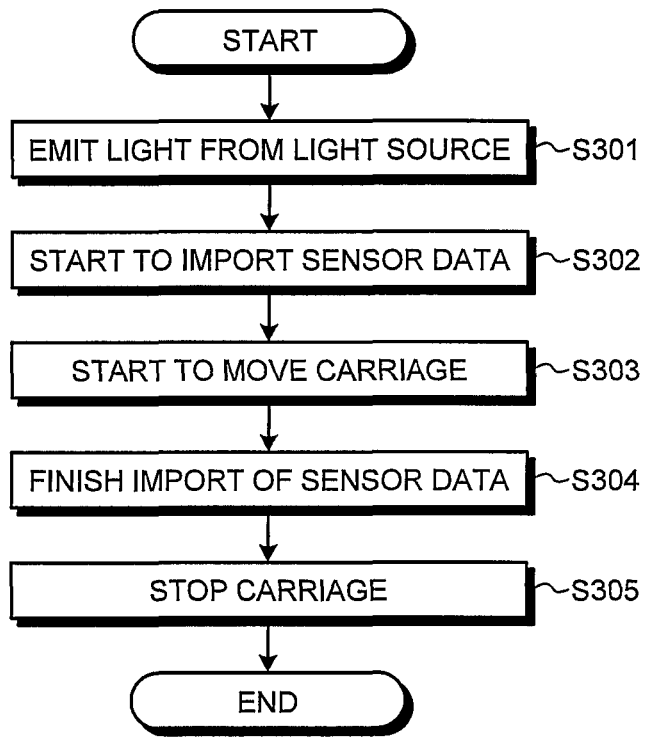
FIG. 10 is a flowchart of a pattern-data reading process.

The main control unit 101 performs the pattern-data reading process as shown in FIG. 10.

That is, the main control unit 101 causes the light emitting element 31 of the reading sensor 30 to emit light based on the calibration result (Step S301), and starts to import sensor data, which is an output value of the light receiving element 32 (Step S302).

Subsequently, the main control unit 101 starts to move the carriage 6 in the main-scanning direction (Step S303), and imports the sensor data output from the light receiving element 32 in a region where the adjustment pattern T is recorded, while moving the carriage 6 (Step S304).

When the import of the sensor data output from the light receiving element 32 is complete in the recording region of the adjustment pattern T, the main control unit 101 stops the movement of the carriage 6 to finish the pattern-data reading process (Step S305).

The main control unit 101 performs the pattern-data reading process in the manner as described above, specifically, by setting the PWM value for driving the light emitting element 31 of the reading sensor 30 in the light-emission control unit 311, and the light-emission control unit 311 outputs a light-emission pulse signal having the PWM value to the smoothing circuit 312. The smoothing circuit 312 smoothes the light-emission pulse signal and outputs the smoothed light-emission pulse signal to the drive circuit 313. The drive circuit 313 drives the light emitting element 31 to emit light according to the light-emission pulse signal and irradiate outgoing light from the light emitting element 31 to the recording medium P on which the adjustment pattern T is formed.

In the reading sensor 30, reflected light reflected from the adjustment pattern T enters into the light receiving element 32 by irradiating the outgoing light from the light emitting element 31 to the adjustment pattern T on the recording medium P. The light receiving element 32 of the reading sensor 30 outputs an analog detection signal according to the light receiving amount of the reflected light from the adjustment pattern T to the photoelectric conversion unit 314.

The photoelectric conversion unit 314 photoelectrically converts the detection signal input from the light receiving element 32 of the reading sensor 30, and outputs the photoelectrically converted signal (the sensor output voltage) to the low-pass filter circuit 315.

The low-pass filter circuit 315 removes noise from the sensor output voltage data and outputs the sensor output voltage data to the A/D conversion circuit 316, and the A/D conversion circuit 316 converts the sensor output voltage data to digital data and outputs the digital data to the FPGA 116.

Referring back to FIG. 6, after performing the pattern-data reading process, the main control unit 101 checks whether the pattern-data reading process has been performed for the preset specified number of times M (Step S106). At Step S106, when the pattern-data reading process has not been performed for the specified number of times M (NO at Step S106), the main control unit 101 performs the pattern-data reading process again (Step S105). The main control unit 101 performs the pattern-data reading process repeatedly until the pattern-data reading process has been performed for the specified number of times M (Steps S105 and S106).

At Step S106, when the pattern-data reading process has been performed for the specified number of times M (YES at Step S106), the main control unit 101 performs preprocessing with respect to the sensor-output voltage data acquired at the pattern-data reading process performed M times (Step S107).

Figure 11:
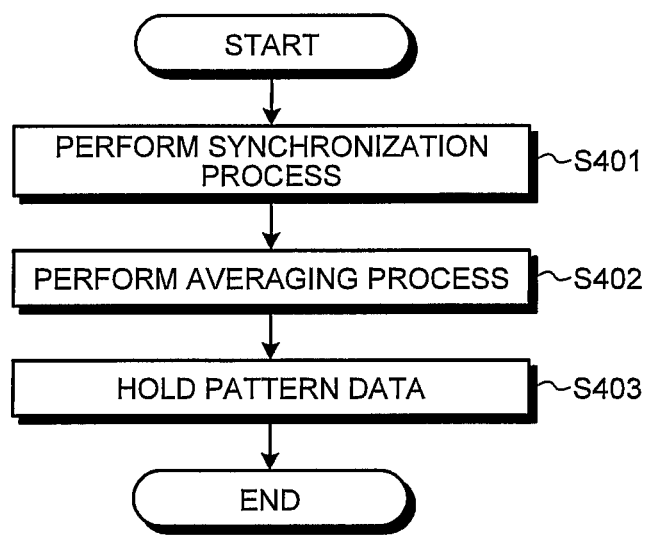
FIG. 11 is a flowchart of preprocessing of pattern data.

In the main control unit 101, the FPGA 116 performs the preprocessing of the pattern data as shown in FIG. 11.

That is, the FPGA 116 performs a synchronization process for aligning the positions of data in the main-scanning direction of the respective adjustment patterns T of M pieces of pattern data acquired by the pattern-data reading process performed M times (Step S401). The FPGA 116 performs an averaging process for averaging the synchronized M pieces of pattern data (Step S402), and stores the averaged pattern data in the shared memory 317 (Step S403).

When the preprocessing of the pattern data is complete, the main control unit 101 performs a positional deviation adjustment-value calculation process (Step S108), and checks whether a calculation of the positional deviation adjustment value for the preset specified number of times N (Step S109) has been performed. The main control unit 101 performs the positional deviation adjustment-value calculation process as the positional deviation correcting unit 302.

At Step S109, when the positional deviation adjustment-value calculation process has not been performed at least twice (described as N times in FIG. 6) (NO at Step S109), the main control unit 101 returns to Step S103 to perform the processes described above from the import of the latest positional deviation adjustment value (Steps S103 to S109).

At Step S109, when the positional deviation adjustment-value calculation process has been performed at least twice (N times) (YES at Step S109), the main control unit 101 finishes the image positional deviation adjustment process.

In the image positional deviation adjustment-value calculation process described above, the main control unit 101 first detects the position of the adjustment pattern T based on the pattern data, which is the output result of the light receiving element 32 of the reading sensor 30, to calculate a deviation amount (a liquid-droplet landing deviation amount) relative to the reference position, as the positional deviation amount calculating unit 304.

That is, when the adjustment pattern T is to be read by the reading sensor 30, the image forming apparatus 1 moves the carriage 6 in the main-scanning direction, and moves the read light spot Y of the reading sensor 30 having the spot diameter d same as the pattern width D of the adjustment pattern T in a direction shown by an arrow as shown in FIG. 9, thereby reads the adjustment pattern T.

Figure 12:
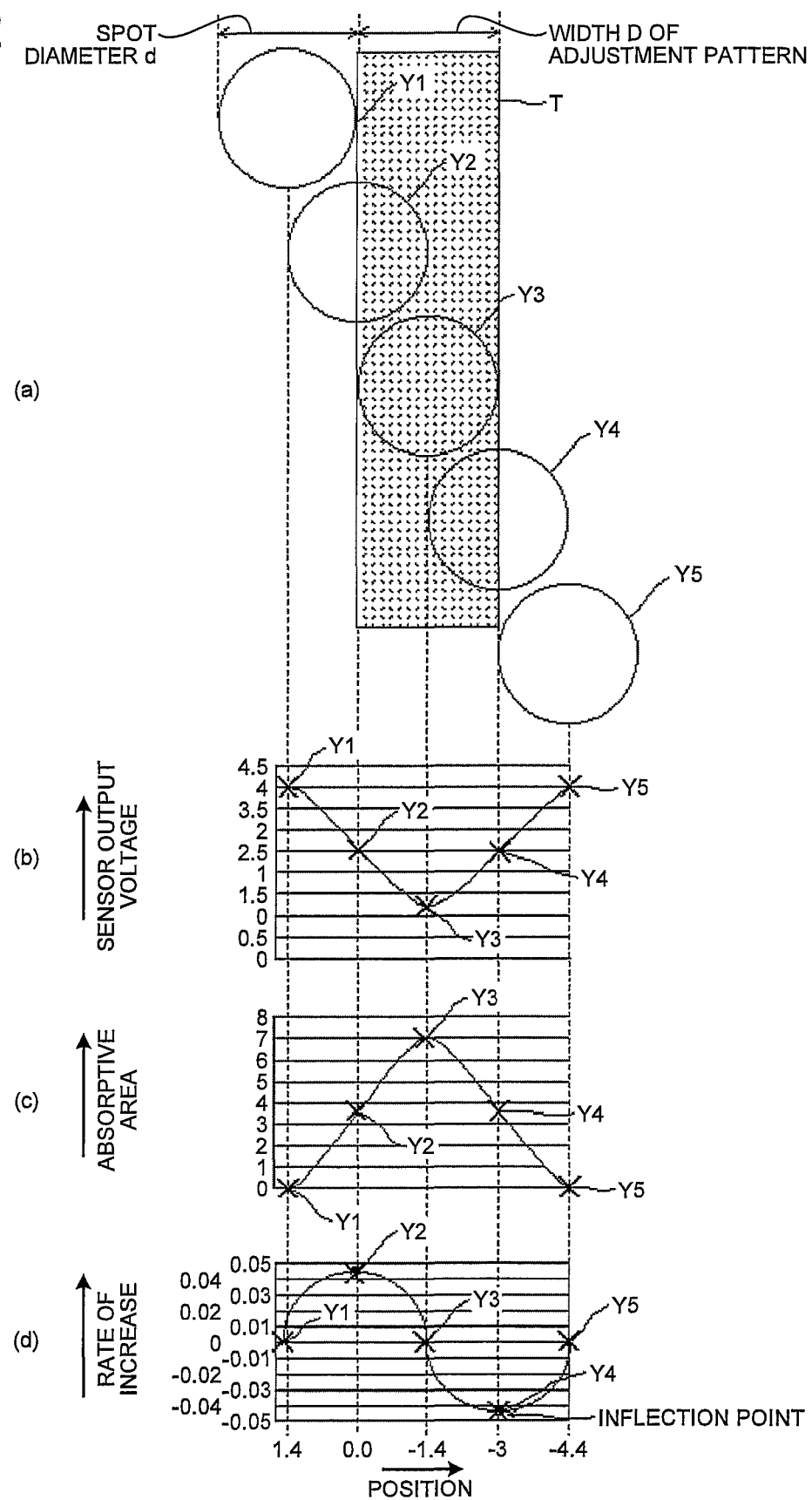
FIG. 12 depicts a relation among the read light spot, the adjustment pattern, and a sensor output voltage.

In this case, the read light spot Y passes across the adjustment pattern T, as shown in section (a) in FIG. 12, because the reading sensor 30 moves in the main-scanning direction together with the carriage 6 from a read light spot Y1 to a read light spot Y5. Section (b) in FIG. 12 depicts a sensor output voltage output from the light receiving element 32 of the reading sensor 30 corresponding to the positional relation of the read light spot Y and the adjustment pattern T in section (a) in FIG. 12, section (c) in FIG. 12 depicts an absorptive area by the adjustment pattern T of the read light in the read light spot Y, and section (d) in FIG. 12 depicts a rate of increase of the absorptive area obtained by differentiating the absorptive area in section (c) in FIG. 12.

That is, at the position of the read light spot Y1, an end of the read light spot Y1 in a moving direction aligns with the edge of the adjustment pattern T, and does not overlap on the adjustment pattern T, and thus the reading sensor 30 does not detect the adjustment pattern T. Therefore, the sensor output voltage of the reading sensor 30 at this time has, as shown in section (b) in FIG. 12, a voltage value when an image is not present.

At the position of a read light spot Y2, half of the read light spot Y2 in the moving direction overlaps on the adjustment pattern T, and thus the reading sensor 30 detects the adjustment pattern T, and a rate of decrease of reflected light is the largest. That is, a rate of change in a positive direction per unit time of the area in which the read light spot Y overlaps on the adjustment pattern T is the largest.

At the position of a read light spot Y3, the whole read light spot Y3 overlaps on the adjustment pattern T, and as described above, it is set such that the spot diameter d of the read light spot Y matches with the width (the pattern width) D of the adjustment pattern T. Therefore, intensity of reflected light of the read light irradiated from the reading sensor 30 to the recording medium P is the lowest in this instant of time, and the sensor output voltage of the reading sensor 30 has the lowest value as shown in section (b) in FIG. 12.

At the position of a read light spot Y4, half of the read light spot Y4 on the opposite side to the moving direction of the read light spot Y2 overlaps on the adjustment pattern T, and thus the reading sensor 30 detects the adjustment pattern T, and a rate of increase of reflected light is the largest. That is, the rate of change in a negative direction per unit time of the area in which the read light spot Y overlaps on the adjustment pattern T is the largest.

At the position of a read light spot Y5, opposite to the position of the read light spot Y1, opposite to the moving direction of the read light spot Y1, an end on the opposite side to the moving direction of the read light spot Y1 aligns with the edge of the adjustment pattern T, and does not overlap on the adjustment pattern T, and thus the reading sensor 30 does not detect the adjustment pattern T. Therefore, the sensor output voltage of the reading sensor 30 at this time has, as shown in section (b) in FIG. 12, the voltage value when an image is not present.

In this manner, at the position of the read light spot Y2, the rate of increase of reflected light of the read light on the recording medium P is the largest, and at the position of the read light spot Y4, the rate of increase of reflected light of the read light on the recording medium P is the largest. Therefore, as shown in section (d) in FIG. 12, an inflection point at which the rate of increase of the absorptive area changes from an increasing tendency to a decreasing tendency matches with the read light spot Y2. Furthermore, an inflection point, at which the rate of increase of the absorptive area changes from the decreasing tendency to the increasing tendency, matches with the read light spot Y4.

Therefore, when the sensor output voltage of the reading sensor 30 indicates the inflection point, it means that the read light spot Y matches with the edge position of the adjustment pattern T. As a result, by accurately detecting the inflection point by the sensor output voltage of the reading sensor 30, the edge position of the adjustment pattern T can be detected accurately.

FIG. 12 depicts a state where the adjustment pattern T is read by the reading sensor 30, while moving the carriage 6 in the main-scanning direction in a state with the recording medium P being conveyed in the sub-scanning direction at a constant speed. In the image positional deviation adjustment process, the adjustment pattern T can be read by the reading sensor 30, while moving the carriage 6 in the main-scanning direction in a state where the recording medium P is stopped at a position where the adjustment pattern T on the recording medium P can be read by the reading sensor 30.

The edge position of the adjustment pattern T can be detected based on the inflection point of the rate of increase or the rate of decrease of the absorptive area.

That is, the sensor output voltage of the reading sensor 30 shows a waveform, whose schematic view is shown in section (a) in FIG. 13, and section (b) in FIG. 13 depicts an enlarged view of the waveform.

The inflection point is at a position where an inclination obtained by differentiating the sensor output voltage and the absorptive area is closest to zero.

In the image forming apparatus 1, an upper limit threshold Vru and a lower limit threshold Vrd of the sensor output voltage are preset so as to include the inflection point. The main control unit 101 sets the output of the light emitting element 31 and the sensitivity of the light receiving element 32 by the calibration process described above, so that the sensor output voltage becomes substantially the same constant value (for example, 4 V) with respect to a region where the adjustment pattern T on the recording medium P is not present. Furthermore, the CPU 111 corrects the sensor output voltage so that a maximum value of the sensor output voltage becomes substantially the same constant value by an amplitude correcting process, so that the inflection point is included between the upper limit threshold Vru and the lower limit threshold Vrd even if the sensor output voltage is unstable.

The main control unit 101 searches a falling part of the sensor output voltage in a direction shown by an arrow Q1 in section (b) in FIG. 13 and stores a point at which the sensor output voltage becomes equal to or lower than the lower limit threshold Vrd as a point P2. The main control unit 101 then searches the sensor output voltage from the point P2 in a direction shown by an arrow Q2 and stores a point at which the sensor output voltage exceeds the upper limit threshold Vru as a point P1.

The main control unit 101 calculates a regression line L1 shown in section (a) in FIG. 13 by using a plurality of pieces of sensor output voltage data between the point P1 and the point P2, and calculates a point of intersection of the regression line L1 and an intermediate value Vc between the upper and lower limit thresholds Vru and Vrd to designate the point of intersection as an intersection C1.

Similarly, the main control unit 101 searches a rising part of the sensor output voltage in a direction shown by an arrow Q3 in section (b) in FIG. 13 and stores a point at which the sensor output voltage becomes equal to or higher than the higher limit threshold Vru as a point P4. The main control unit 101 then searches the sensor output voltage from the point P4 in a direction shown by an arrow Q4 and stores a point at which the sensor output voltage becomes equal to or lower than the lower limit threshold Vrd as a point P3.

The main control unit 101 calculates a regression line L2 shown in section (a) in FIG. 13 by using a plurality of pieces of sensor output voltage data between the point P3 and the point P4, and calculates a point of intersection of the regression line L2 and the intermediate value Vc between the upper and lower limit thresholds Vru and Vrd to designate the point of intersection as an intersection C2.

The main control unit 101 specifies an intermediate point between the intersection C1 and the intersection C2 as a center position (a middle position) of the adjustment pattern T. Based on the edge-position detection process described above, the intersection C1 and the intersection C2 substantially coincide with the inflection point.

As described above, the main control unit 101 calculates a difference between an ideal edged-to-edge distance between two adjacent adjustment patterns T and an edge-to-edge distance which corresponds to a center-to-center distance obtained from the intersection C1 and the intersection C2 of each of two adjacent adjustment patterns. The difference indicates a deviation amount of landing position of the liquid droplet to the actual edge position with respect to the ideal edge position.

Therefore, the main control unit 101 is executing a calculation function of calculating the positional deviation correction amount for correcting a landing position calculated by the positional deviation amount calculating unit 304 in FIG. 4, and functions as a calculator.

The main control unit 101 calculates a correction value for correcting a recording position of the adjustment pattern T by correcting the timing of ejecting the liquid droplet from the recording heads 20y to 20k (a liquid-droplet ejection timing) based on the calculated positional deviation correction amount, and sets the correction value in the liquid-droplet ejection control unit 303.

Therefore, the main control unit 101 is performing a ejection-timing correction-amount calculating process of the ejection-timing correction-amount calculating unit 305 in FIG. 4, and functions as a correction unit together with the liquid-droplet ejection control unit 303.

The liquid-droplet ejection control unit 303 drives the recording heads 20y to 20k at the corrected liquid-droplet ejection timing and can reduce the positional deviation of landing positions.

Furthermore, the main control unit 101 performs the ejection-timing adjustment process for adjusting the ejection timing of the liquid droplet by the recording heads 20y to 20k by performing the recording process of the adjustment pattern T on the recording medium P by the liquid-droplet ejection control unit 303, the reading process of the adjustment pattern T by the reading sensor 30, the calculation process of the positional deviation correction amount as a calculation unit, and the correction process of the recording position of the adjustment pattern T as a correction unit repeatedly at least twice. Therefore, the main control unit 101 also functions as a ejection timing adjustment unit.

As described above, when an edge is to be detected by using the sensor output voltage data between the upper limit threshold Vru and the lower limit threshold Vrd, when at least the inflection point is not included between the upper limit threshold Vru and the lower limit threshold Vrd, edge detection cannot be performed. In the following explanations, a width formed by the upper limit threshold Vru and the lower limit threshold Vrd is appropriately referred to as "threshold region". The threshold region is defined by designating the sensor output voltage as a unit, but can be also defined by the absorptive area corresponding to the sensor output voltage.

Figure 14:
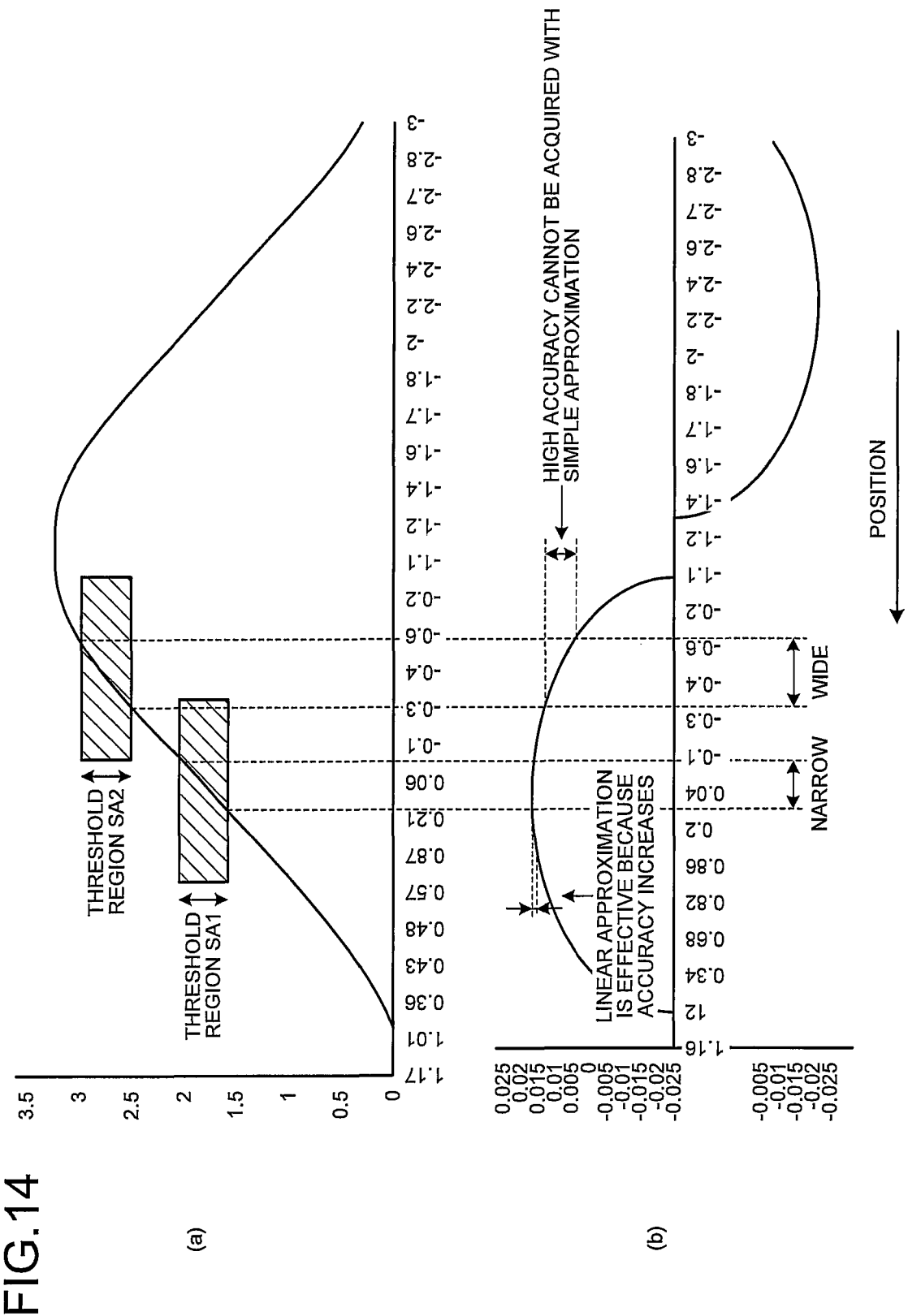
FIG. 14 depicts a relation between an absorptive area and a rate of increase thereof.

FIG. 14 is an example of the absorptive area (section (a) in FIG. 14) and a rate of increase of the absorptive area (section (b) in FIG. 14). The rate of increase of the absorptive area in section (b) in FIG. 14 has a waveform, which is obtained by differentiating the absorptive area in section (a) in FIG. 14.

In FIG. 14, a threshold region SA1 is near the center of an amplitude of the waveform indicating the absorptive area, that is, when the threshold region is present in a region near the inflection point, and a threshold region SA2 is when the threshold region is present at a position deviated from the inflection point.

As shown in FIG. 14, when the inflection point is in the threshold region SA1, as explained with reference to FIG. 12, the main control unit 101 can accurately detect the edge position of the adjustment pattern T.

On the other hand, when the inflection point is in the threshold region SA2 shown in FIG. 14, the main control unit 101 cannot detect the accurate edge position, even if the regression line is obtained from the threshold region SA2. Furthermore, when it is known that the inflection point is in the threshold region SA2, the main control unit 101 can obtain the regression line by shifting the threshold region from SA1 to the position of SA2. However, when the position of the inflection point largely deviates, a curve of the sensor output voltage and the absorptive area may be deformed. For example, when the main control unit 101 obtains the regression line from a threshold region in which an inclination of the curve of the absorptive area becomes large, the intersections C1 and C2 may deviate largely. As shown in section (b) in FIG. 14, the main control unit 101 can estimate the width of the position including the vicinity of an apex in a sufficiently narrow range in the threshold region SA1. However, in the threshold region SA2, because the width of the position including the inflection point is wide, the position including a change point becomes difficult to be estimated.

Therefore, when the amplitude of the sensor output voltage fluctuates to such a level that the inflection point is not included in the threshold region SA1, when the edge position is specified based on the threshold region SA1 or the edge position is determined by shifting the threshold region to obtain the inflection point itself, accuracy becomes insufficient.

Accordingly, as shown in FIG. 6, the image forming apparatus 1 according to the present embodiment performs the positional deviation adjustment process repeatedly at least twice (described as N times in FIG. 6), which is preset, thereby improving the accuracy.

Furthermore, as shown in FIG. 8, the image forming apparatus 1 according to the present embodiment sets the edge interval between the adjustment patterns T the integral multiple of the cogging cycle Sk (De=n×Sk) of the main-scanning motor 10 that moves the carriage 6 mounted with the reading sensor 30 in the main-scanning direction.

By setting the edge interval in this manner, the read rate of the reading sensor 30 at the respective left edge positions or right edge positions of the reference pattern Tk and the pattern to be measured Ts of the adjustment pattern T is matched with the phase of speed fluctuation of the carriage 6 mounted with the reading sensor 30, and thus the speed becomes the same.

That is, the main control unit 101 assumes that the sensor read rate is a predetermined constant value (for example, 50 mm/s) in order to calculate the interval between the adjustment patterns T by detecting the edges of the adjustment patterns T (or the center positions of the adjustment patterns T) by the reading sensor 30. The main control unit 101 multiplies the sensor read rate, which is assumed to be constant, by an arrival time interval until the reading sensor 30 detects the edge (or the center position) of the first adjustment pattern T since the reading sensor 30 detects the edge (or the center position) of the second adjustment pattern T, thereby calculating the interval between the adjustment patterns T.

However, in practice, the sensor read rate of the reading sensor 30 includes speed fluctuation.

As a result, there is an error based on the read rate difference between a positional deviation amount of a calculation value in the interval between the adjustment patterns T calculated by the CPU 111 and a positional deviation amount in the actual interval between the adjustment patterns T.

Figure 15:
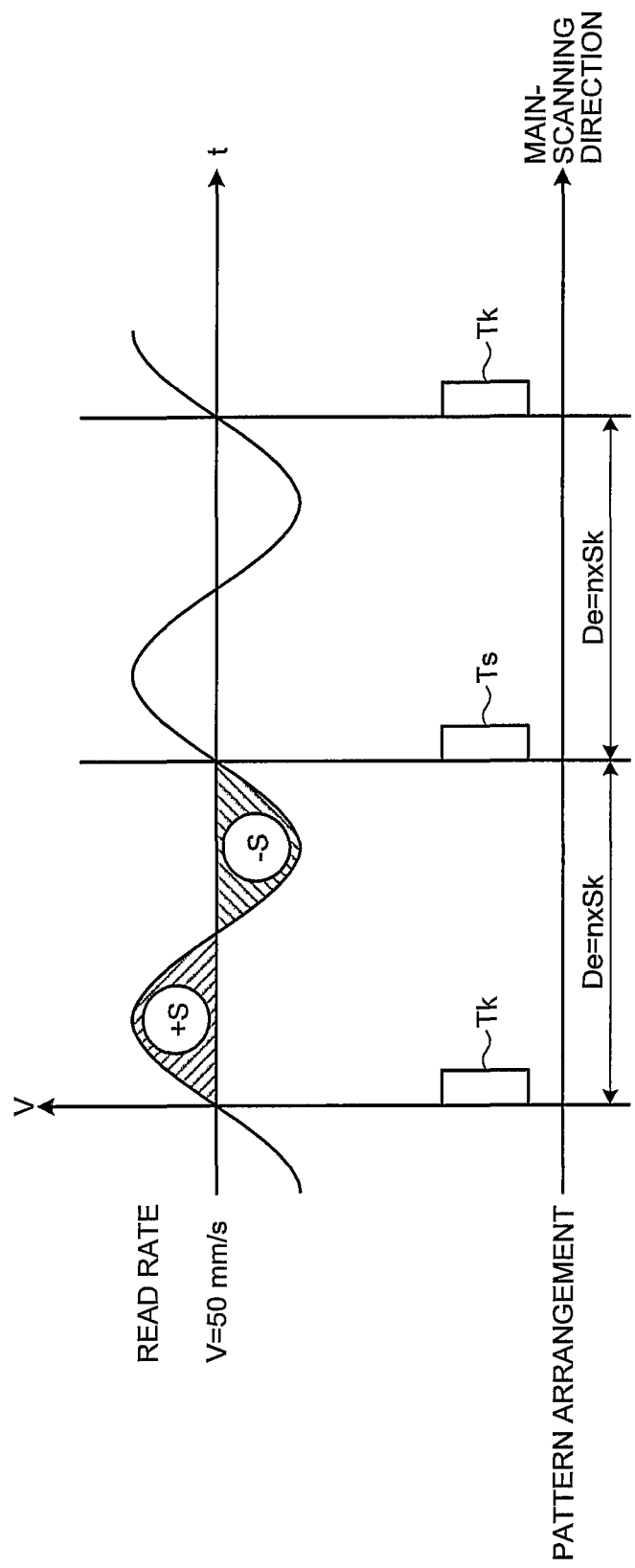
FIG. 15 depicts a state where an arrangement of the adjustment patterns aligns with the read rate.

Therefore, when the interval between the adjustment patterns T is to be obtained based on the edges of the adjustment patterns T, as shown in FIG. 15, the image forming apparatus 1 according to the present embodiment aligns the edge interval De between the adjustment patterns T with the integral multiple of the cogging cycle Sk of the main-scanning motor 10 that moves the carriage 6 mounted with the reading sensor 30 in the main-scanning direction.

By this method, the actual read rates (or phases of the actual read rate) of the reading sensor 30 at the respective left edge positions or right edge positions of the reference pattern Tk and the pattern to be measured Ts of the adjustment pattern T are matched with each other, thereby enabling to offset the error. That is, an area +S and an area −S shown in FIG. 15 become the same, and the actual read rate becomes equal to the calculation value by the theoretical read rate.

Figure 16:
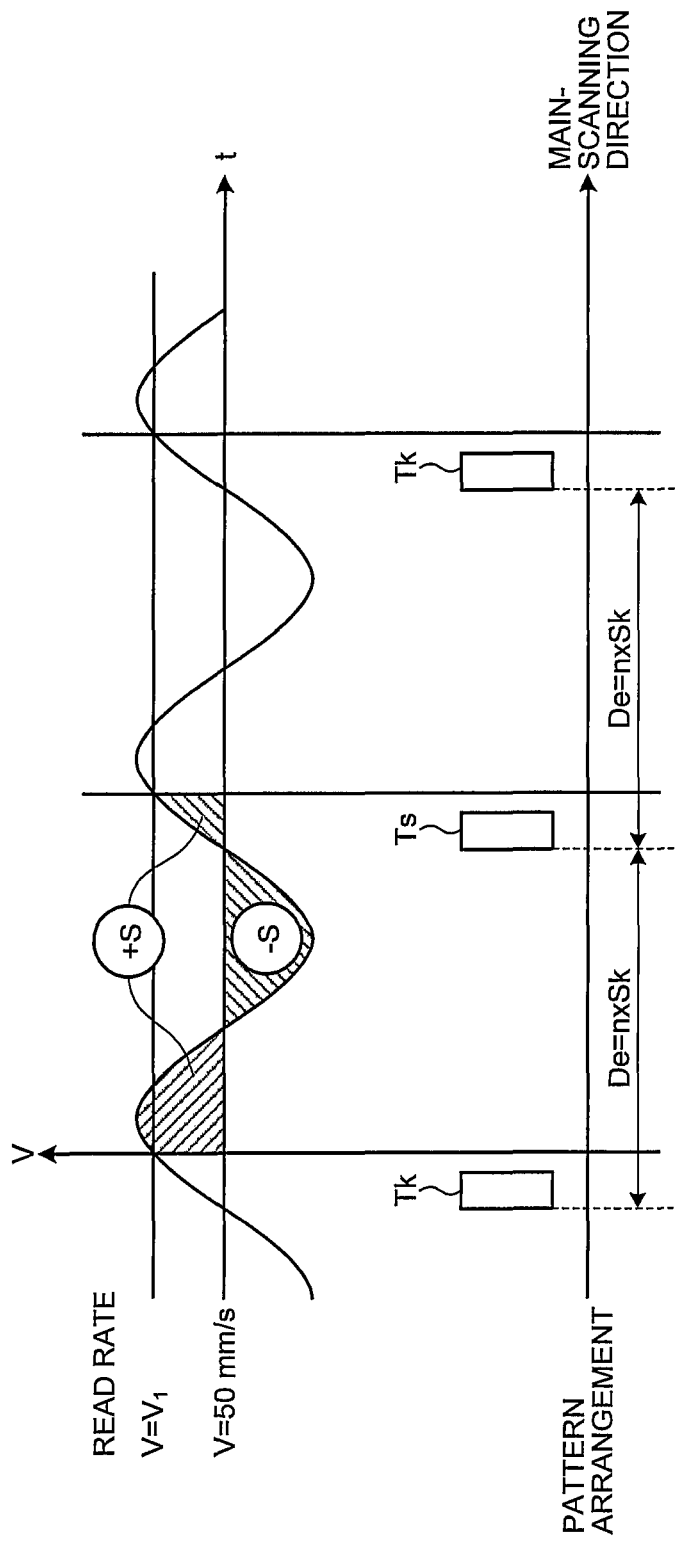
FIG. 16 depicts a state where the arrangement of the adjustment patterns aligns with the read rate, although an initial phase is not aligned.

Furthermore, when the edge interval De of the adjustment patterns T aligns with the integral multiple of the cogging cycle Sk of the main-scanning motor 10, even if the initial phase of the adjustment pattern T is deviated with the cogging cycle Sk as shown in FIG. 16, the error can be offset. That is, as shown in FIG. 16, even if the edge of the adjustment pattern T (the reference pattern Tk in FIG. 16) is deviated with the initial phase V1 (V=V1) of the read rate V of the main-scanning motor 10, the error can be offset. That is, the area +S and the area −S shown in FIG. 16 become the same, and the actual read rate becomes equal to the calculation value by the theoretical read rate.

Figure 17:
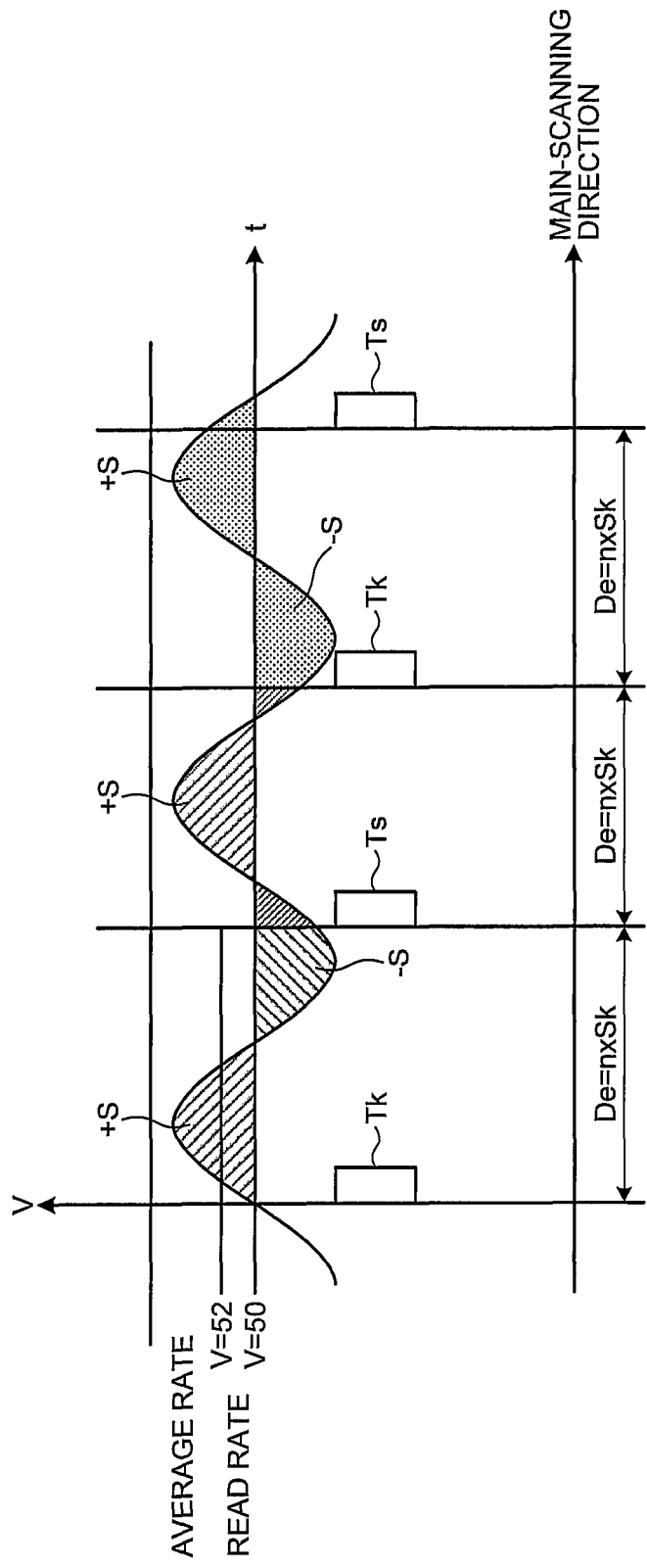
FIG. 17 is an example when an edge interval between the adjustment patterns is deviated with an integral multiple of a cogging cycle.

On the other hand, as shown in FIG. 17, when the edge interval De of the adjustment patterns T is deviated with the integral multiple of the cogging cycle Sk of the main-scanning motor 10, an average flux v becomes v=52 mm/s as in the first cycle on the leftmost in FIG. 17, and differs from the theoretical rate. That is, an absolute values of the upper area +S and the lower area −S on the line of v=50 mm/s are not equal to each other, and thus the error is not converged.

It has been explained with reference to FIG. 9 that the width D of the respective adjustment patterns T is the same as the spot diameter d of the read light spot Y, and, as shown in section (b) FIG. 18, when the pattern width D and a space between the adjacent patterns T (i.e., De-D) are larger than the spot diameter d, the positional deviation adjustment can be performed appropriately. However, as shown in section (a) in FIG. 18, when the pattern width D and the space (De-D) of the adjustment pattern T are smaller than the spot diameter d of the read light spot Y, a dynamic range of the sensor output voltage of the reading sensor 30 is small. As a result, the threshold region is hardly set, and edge detection accuracy of the adjustment pattern T decreases.

Figure 18:
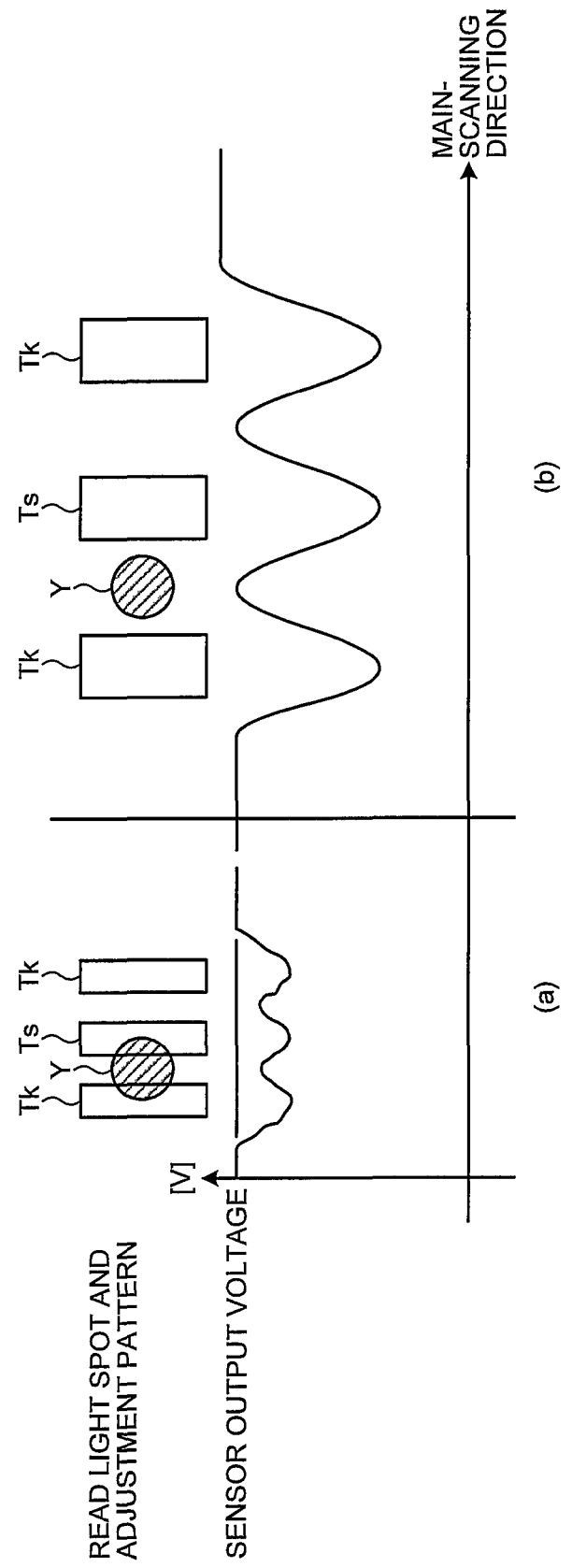
FIG. 18 depicts a relation among a spot diameter of the read light spot, the edge interval between the adjustment patterns, and the sensor output voltage.

In contrast, when the width D and the space (De-D) of the adjustment pattern T are larger than the spot diameter d of the read light spot Y, as shown in section (b) in FIG. 18, the dynamic range of the sensor output voltage of the reading sensor 30 increases. As a result, the threshold region can be easily set, and edge detection accuracy of the adjustment pattern T is improved, thereby enabling to perform the positional deviation adjustment accurately.

Figure 19:
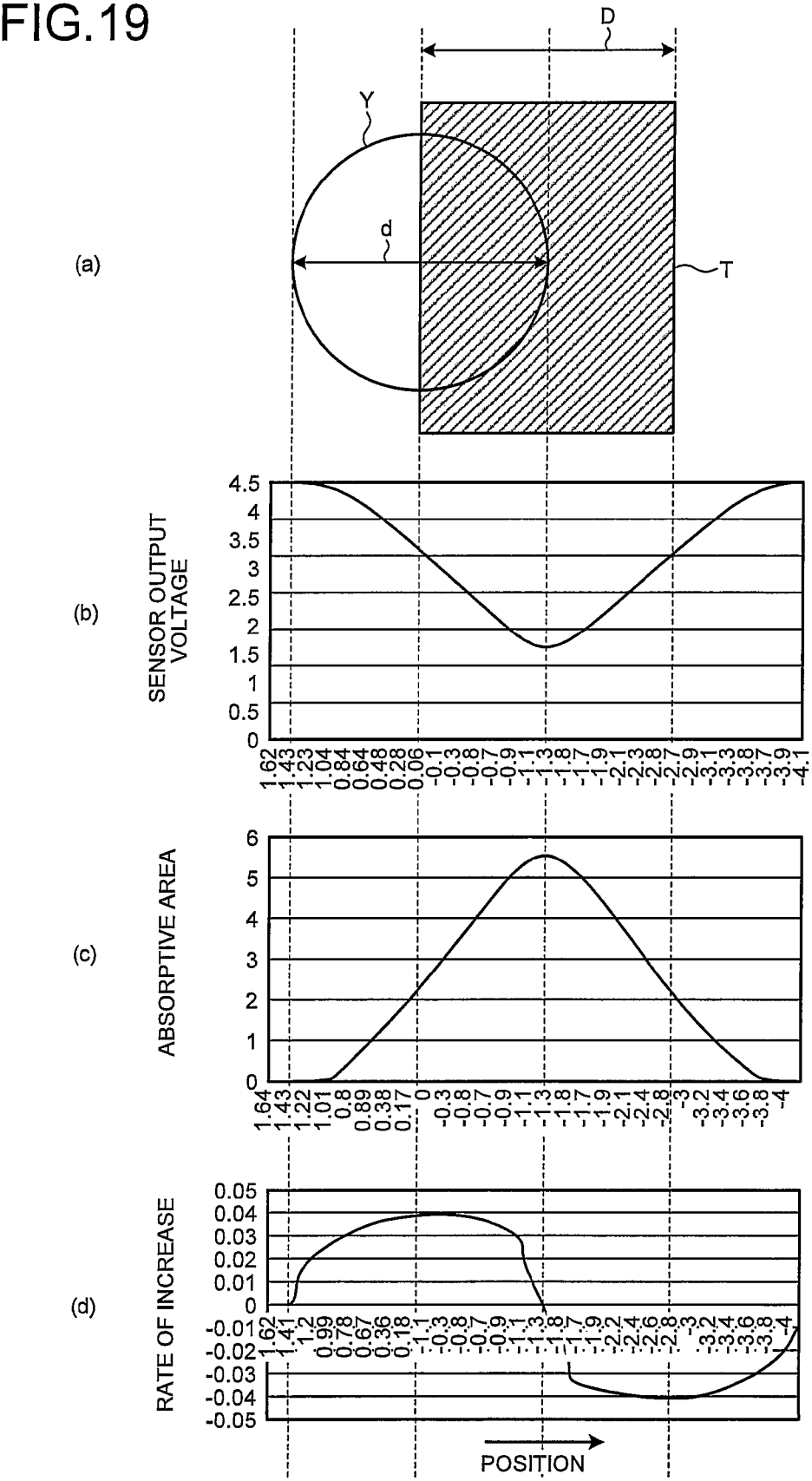
FIG. 19 depicts a relation among the spot diameter, the edge interval, and the sensor output voltage when "spot diameter>edge interval"

As shown in section (a) in FIG. 19, when the spot diameter d is larger than the pattern width D (in the case of d>D), the sensor output voltage is the smallest, as shown in section (b) in FIG. 19, at a position where the center of the spot diameter passes the center of the pattern width D. In this case, the absorptive area has a steep change near the center of the adjustment pattern T, as shown in section (c) in FIG. 19, because there is no timing at which the spot light Y and the adjustment pattern T completely overlap on each other. Furthermore, the rate of increase obtained by differentiating the absorptive area decreases quickly, as shown in section (d) in FIG. 19, at a point in time when the right end of the spot light Y moves beyond the center of the adjustment pattern T.

However, even in this case, the main control unit 101 can acquire the sensor output voltage near the inflection point to obtain the intersections C1 and C2 by performing the edge-position detection process described above, so long as the spot diameter d is not extremely larger than the pattern width D of the adjustment pattern T.

Figure 20:
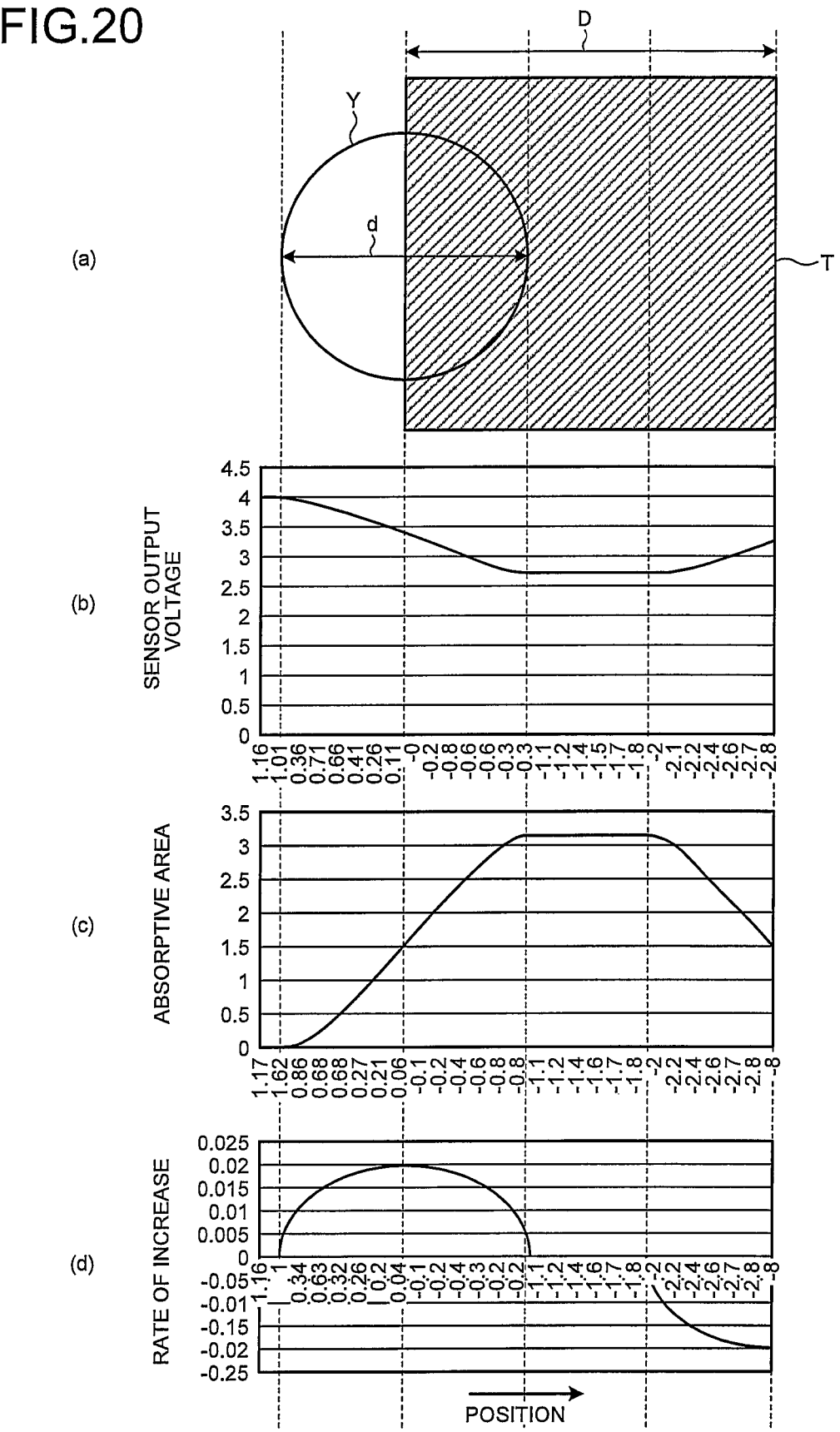
FIG. 20 depicts a relation among the spot diameter, the edge interval, and the sensor output voltage when "spot diameter<edge interval"

Furthermore, as shown in section (a) in FIG. 20, when the spot diameter d is smaller than the pattern width D (d<D), in the sensor output voltage, a constant period continues for a predetermined time, as shown in section (b) in FIG. 20, because the state where the spot light Y and the adjustment pattern T completely overlap on each other continues. Further, in this case, in the absorptive area, a constant period continues for a predetermined time, as shown in section (c) in FIG. 20, during the period in which the spot light Y and the adjustment pattern T completely overlap on each other. In the rate of increase obtained by differentiating the absorptive area, there is a zero region as shown in section (d) in FIG. 20, while the absorptive area is constant. Thereafter, at a point in time when the right end of the spot light Y moves beyond the adjustment pattern T, the rate of increase gradually decreases (the rate of decrease increases) as the absorptive area turns to decrease.

Even in this case, the CPU 111 can obtain the sensor output voltage near the inflection point sufficiently, thereby enabling to obtain the intersections C1 and C2 sufficiently.

As described above, the image forming apparatus 1 performs the image positional deviation adjustment process for adjusting the liquid-droplet ejection timing from the recording heads 20y to 20k at least twice by detecting the edge positions of the adjustment patterns T and calculating the ejection-timing correction amount, thereby enabling to adjust the positional deviation accurately.

The main control unit 101 adopts the pattern arrangement of the adjustment patterns T aligned with the cogging cycle Sk to perform the image positional deviation adjustment process, and stores the positional deviation adjustment values of the reference pattern Tk and the pattern to be measured Ts of the adjustment pattern T in the NVRAM 114.

However, such a state where the positional deviation adjustment value of the reference patterns Tk and the pattern to be measured Ts of the adjustment pattern T stored in the NVRAM 114 is out of alignment may occur, and the pattern to be measured Ts may be recorded at a position deviated from the cycle.

When the recording position of the pattern to be measured Ts is deviated, the read rate or the phase of the read rate is not aligned with the cogging cycle Sk. Therefore, the error is not offset, and an error between the theoretical calculation value of the read rate and the actual positional deviation amount remains by the positional deviation amount.

Figure 21:
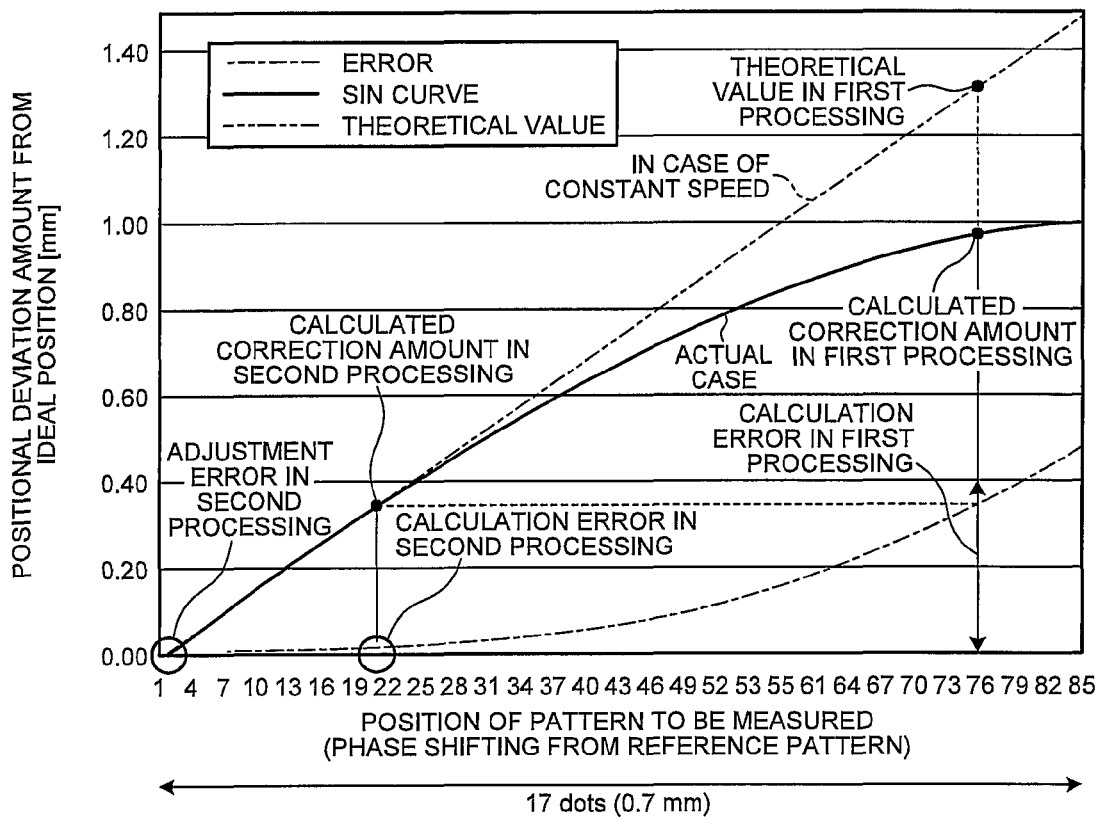
FIG. 21 is an explanatory diagram of a process to converge a deviation of a positional deviation adjustment value of a pattern to be measured.

That is, the error corresponds to a portion indicated by a double-headed arrow as a calculation error in the first processing with respect to an error curve indicated by a one-dot chain line in FIG. 21. In FIG. 21, the error corresponds to a difference between a positional deviation amount from the theoretical value (a cogging cycle position) in the first processing in the theoretical value curve at the time of a constant speed indicated by a two-dot chain line and a positional deviation amount (a required correction amount) from a sin curve (a position at the time of an actual speed) indicated by a solid line.

It is understood that the error occurs corresponding to the initial value (a first calculation error) at the time of adjustment, and as shown in FIG. 21, when the initial value is close to a target value, that is, zero positional deviation amount, the error has a property having error convergence.

Therefore, when the main control unit 101 performs the second image positional deviation adjustment with the calculation error in the first processing shown in FIG. 21, the calculation error in the second processing decreases than the calculation error in the first processing, which is shown as a calculation error in the second processing in FIG. 21. That is, by repeatedly performing the image positional deviation adjustment process, the adjustment accuracy can be improved.

In FIG. 21, the pattern to be measured Ts is at a position deviated by about 0.95 mm before the adjustment, and the theoretical positional deviation calculation value is 1.3 mm. Therefore, 0.35 mm is the error of the pattern to be measured Ts. The main control unit 101 finishes the first adjustment processing with the positional deviation of 0.35 mm. Subsequently, the main control unit 101 performs adjustment in the second processing. At this time, in FIG. 21, because the theoretical positional deviation calculation value is 0.34 mm, the error of the pattern to be measured Ts becomes 0.01 mm (10 μm (micrometers)), and the error is the adjustment accuracy after finishing adjustment in the second processing.

Therefore, even when the positional deviation adjustment values of the pattern to be measured Ts and the reference pattern Tk are deviated, the adjustment accuracy is considerably improved by performing the image positional deviation adjustment process at least twice.

That is, as shown in FIGS. 15 and 21, when the initial phase is zero, there is the error convergence, and the adjustment accuracy can be improved by performing the image positional deviation adjustment process repeatedly.

Figure 22:
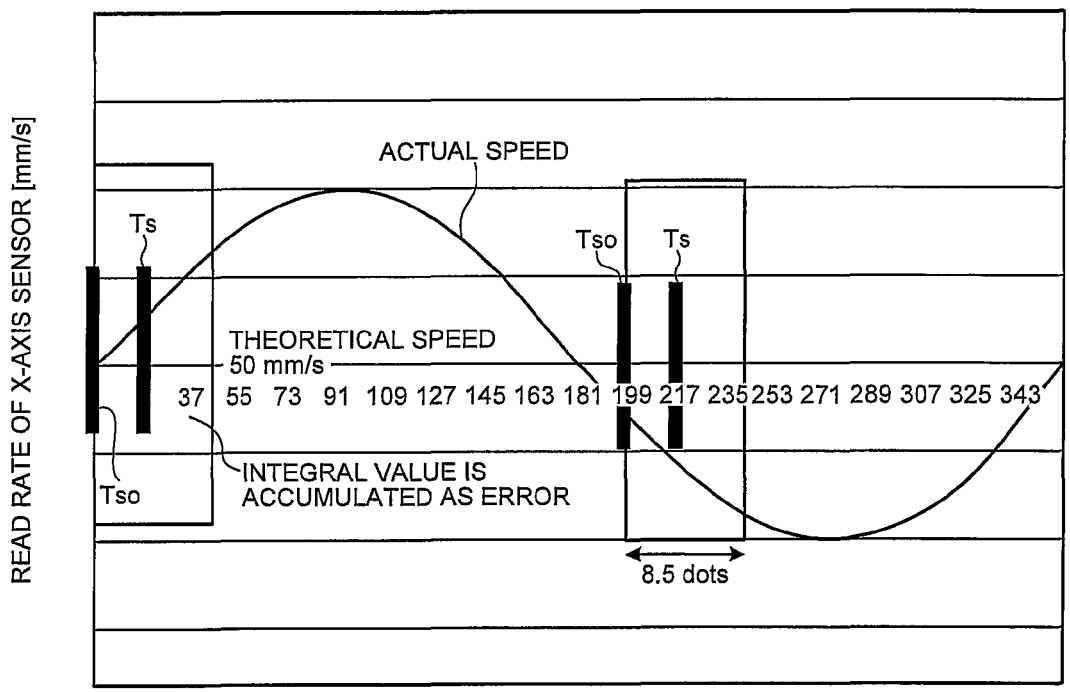
FIG. 22 is an example when an error of the pattern to be measured has error convergence.

As shown in FIG. 22, when there is no positional deviation in the initial phase between the ideal phase and the actual speed, and the positional deviation amount of the pattern to be measured Ts is within 8.5 dots, by performing the image positional deviation adjustment process repeatedly at least twice, the adjustment accuracy can be improved by the error convergence. FIG. 22 depicts an ideal position Tso of the pattern to be measured Ts when the speed of the actual read light spot T (a sin curve) indicated by a solid line has a speed cycle of 56 ms (68 dots per unit of 600 dpi) with respect to the theoretical speed (50 mm/s) and a position at the time of positional deviation (a position indicated by Ts). In FIG. 22, a vertical axis (X axis) denotes a sensor read rate (mm/s) and a horizontal axis (Y axis) denotes a time s.

In FIG. 22, an ideal initial phase Tso of the pattern to be measured Ts is zero as the initial phase. However, the pattern to be measured Ts is recorded at a position Ts deviated in a range of 8.5 dots (in a square frame in FIG. 22). Therefore, an integral value of −S is accumulated also in a region in which the speed always falls below 50 mm/s, and thus there is the convergence. Accordingly, by performing the image positional deviation adjustment process at least twice, the adjustment accuracy can be improved.

Figure 23:
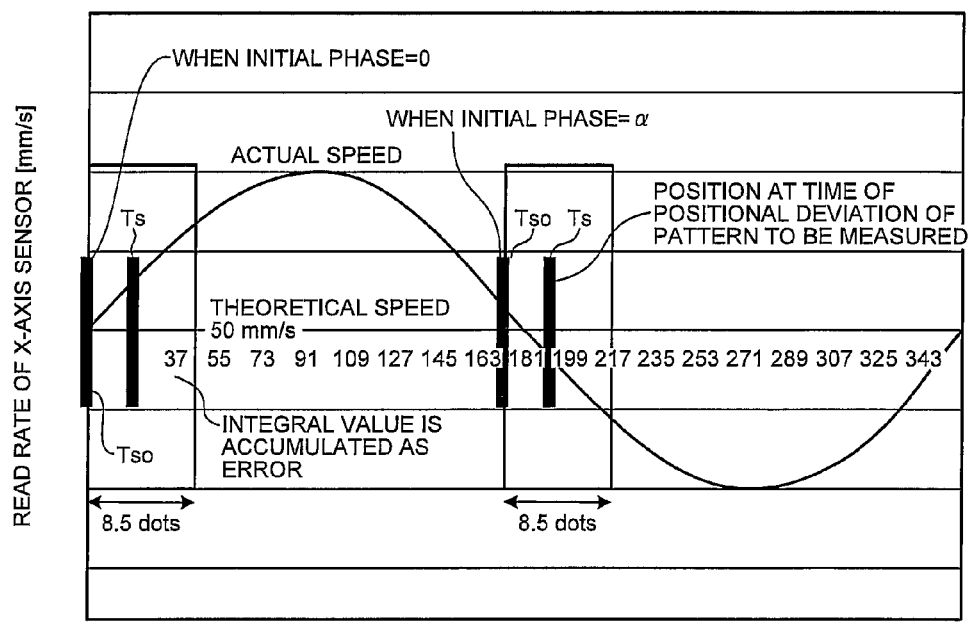
FIG. 23 is an example when the error of the pattern to be measured may not satisfy the error convergence.

However, as shown in FIG. 23, the calculation error in the second processing may not decrease as compared to the calculation error in the first processing. In FIG. 23, a vertical axis (X axis) denotes the sensor read rate (mm/s) and a horizontal axis (Y axis) denotes the time s.

That is, when the ideal initial position Tso is at the position shown in FIG. 23, a positional deviation when a positional deviation of the pattern to be measured Ts occurs is large, and when the ideal initial position is at the position indicated by Ts, the integral value of the positive portion is offset by the negative portion, and such a case may occur that the error approximates to zero as the position is far from the target value. In this case, it cannot be said that there is always error convergence, and even if the image positional deviation adjustment process is performed plural times, the adjustment accuracy is not always improved. However, in FIG. 23, there is error convergence in a portion from the positive portion to zero, and the adjustment accuracy can be improved by performing the image positional deviation adjustment process at least twice.

As a probability in which the adjustment accuracy is not improved even if the image positional deviation adjustment process is performed plural times, the adjustment accuracy can be improved by 75% or more ($=1-\frac{1}{8}\times 2$) in an initial phase by performing the image positional deviation adjustment process at least twice, when the positional deviation amount from the ideal initial position (the cogging cycle position) is within 8.5 dots (in a unit of 600 dpi), that is, within the square frame in FIG. 23. Furthermore, when the positional deviation amount is within 4.25 dots, the adjustment accuracy can be improved by 87.5% or more ($=1-\frac{1}{16}\times 2$) in the initial phase by performing the image positional deviation adjustment process at least twice. When the misregistration amount is within 2.2125 dots, the adjustment accuracy can be improved by 93.75% or more ($=1-\frac{1}{32}\times 2$) in the initial phase by performing the image positional deviation adjustment process at least twice.

That is, in the actual use of the image forming apparatus 1, the positional deviation amount is mainly within 2 dots (about 84 μm in a unit of 600 dpi), and it is unusual that the positional deviation is 4 dots (about 168 μm). Furthermore, the numerical value of probability described above is the worst value, and even in the initial phase in which the error convergence cannot be assured, the error may be converged, for example, in the portion from the positive portion to zero.

Therefore, the image forming apparatus 1 can improve the adjustment accuracy with an extremely high probability in the actual use by performing the image positional deviation adjustment process at least twice.

Furthermore, in the image forming apparatus 1 according to the present embodiment, because the pattern width De is set to the integral multiple of the cogging cycle Sk, the initial phase at the left edge and the right edge of one adjustment pattern T is aligned therewith. As a result, timings at which there is the error convergence of the left edge and the right edge can be aligned, and thus the probability of converging to high adjustment accuracy can be improved.

As described above, the image forming apparatus 1 according to the present embodiment includes: the conveying unit formed of the sub-scanning drive unit 105, the sub-scanning motor 202, and a carrier roller (not shown), which conveys the recording medium P; the carriage 6 that includes the recording heads 20y to 20k to eject the liquid droplet for image recording to the recording medium P, and is supported movably in the main-scanning direction orthogonal to the conveying direction of the recording medium P; the movable-body drive unit formed of the main-scanning drive unit 104 and the main-scanning motor 10, which moves the carriage 6 in the main-scanning direction; the head-drive control unit (adjustment-pattern recording controller) 103 configured to cause a plurality of adjustment patterns T to be recorded with a predetermined edge interval in the main-scanning direction by causing the liquid droplets ejected from the recording heads 20y to 20k to land on the recording medium P, while causing the movable-body drive unit to move the carriage 6 in the main-scanning direction; the reading sensor (reading unit) 30 that is mounted on the carriage 6 to irradiate the recording medium P on which the adjustment patterns T are recorded with read right and read the adjustment patterns T by photoelectrically converting reflected light from the recording medium P; the main control unit (calculator) 101 configured to calculate a positional deviation correction amount for correcting a deviation of a landing position of the liquid droplet, which is ejected respectively from the recording heads 20y to 20k and landed on the recording medium P, based on the interval between the adjustment patterns T recorded on the recording medium P by the head-drive control unit 103 and the read result of the adjustment patterns T read by the reading sensor 30; the main control unit (correction unit) 101 configured to cause the head-drive control unit 103 to record the adjustment patterns T at the recording position where the interval between the adjustment patterns T becomes the integral multiple of a fluctuation cycle in a relative movement of the reading sensor 30 and the adjustment patterns T, which is caused by movement of the carriage 6 mounted with the reading sensor 30 moved by the movable-body drive unit, and correct the recording position of the adjustment patterns T based on the calculated deviation correction amount; and the main control unit (ejection timing adjustment unit) 101 configured to adjust the ejection timing of the liquid droplet by the recording heads 20y to 20k by performing repeatedly at least twice the recording process of the adjustment patterns T on the recording medium P by the head-drive control unit 103, the reading process of the adjustment pattern T by the reading sensor 30, the calculation process of the deviation correction amount, and the correction process of the recording position of the adjustment patterns.

Therefore, even if the deviation adjustment value is not correct, by repeatedly performing the image positional deviation adjustment process, an error from the theoretical read-rate calculation value can be decreased, and the accuracy of image positional deviation adjustment can be improved.

Furthermore, the image forming apparatus 1 according to the present embodiment executes the method of adjusting an image positional deviation including: conveying the recording medium P; moving the carriage 6 in the main-scanning direction orthogonal to the conveying direction of the recording medium P, the carriage 6 including incorporates the recording heads 20y to 20k to eject the liquid droplet for image recording to the recording medium P and being supported movably in the main-scanning direction; recording a plurality of adjustment patterns T are recorded with a predetermined edge interval in the main-scanning direction by causing the liquid droplets ejected from the recording heads 20y to 20k to land on the recording medium P, while moving the carriage 6 in the main-scanning direction; reading, by the reading sensor 30 mounted on the carriage 6, the adjustment patterns T by irradiating the recording medium P on which the adjustment patterns T are recorded with read light and photoelectrically converting reflected light from the recording medium P; calculating a positional deviation correction amount for correcting a deviation of a landing position of the liquid droplet, which is ejected from the recording heads 20y to 20k and landed on the recording medium P, based on the interval between the adjustment patterns T recorded on the recording medium P and a read result of the adjustment patterns read at the reading; correcting that includes reading the adjustment patterns T at a recording position where the interval between the adjustment patterns T becomes an integral multiple of a fluctuation cycle in a relative movement of the reading sensor 30 and the adjustment patterns T, which is caused by movement of the carriage 6 mounted with the reading sensor 30, and correcting the recording position of the adjustment pattern T is corrected based on the positional deviation correction amount calculated at the calculating; and adjusting an ejection timing of the liquid droplet by the recording heads 20y to 20k by performing repeatedly at least twice the recording, the reading, the calculating, and the correcting.

Accordingly, even if the positional deviation adjustment value is not correct, by repeatedly performing the image positional deviation adjustment process, an error from the theoretical read-rate calculation value can be decreased, and the accuracy of image positional deviation adjustment can be improved.

Furthermore, the image forming apparatus 1 according to the present embodiment incorporates a program for adjusting an image positional deviation that causes the CPU 111 as a control processor to perform: causing the recording medium P to be conveyed, causing the carriage 6 to be moved in the main-scanning direction orthogonal to the conveying direction of the recording medium P, the carriage 6 including the recording heads 20y to 20k that eject a liquid droplet for image recording to the recording medium P and being supported movably in the main-scanning direction; causing a plurality of adjustment patterns to be recorded with a predetermined edge interval in the main-scanning direction by causing the liquid droplets ejected from the recording heads 20y to 20k to land on the recording medium P, while causing the carriage 6 to be moved in the main-scanning direction; causing the reading sensor 30 mounted on the carriage 6 to read the adjustment patterns by causing the recording medium P on which the adjustment patterns T are recorded to be irradiated with read light and photoelectrically converting reflected light from the recording medium P; calculating the positional deviation correction amount for correcting a deviation of a landing position of the liquid droplet, which is ejected respectively from the recording heads $20y$ to $20k$ and landed on the recording medium P, based on the interval between the adjustment patterns T recorded on the recording medium P and a read result of the adjustment patterns T read at the reading; correcting that includes recording the adjustment pattern T at a recording position where the interval between the adjustment patterns T becomes an integral multiple of a fluctuation cycle in a relative movement of the reading sensor 30 and the adjustment pattern T, which is caused by movement of the carriage 6 mounted with the reading sensor 30, and correcting the recording position of the adjustment pattern T based on the positional deviation correction amount calculated at the calculating; and adjusting an ejection timing of the liquid droplet by the recording heads $20y$ to $20k$ by performing repeatedly at least twice the recording, the reading, the calculating, and the correcting.

Accordingly, even if the positional deviation adjustment value is not correct, by repeatedly performing the image positional deviation adjustment process, an error from the theoretical read-rate calculation value can be decreased, and the accuracy of image positional deviation adjustment can be improved.

Furthermore, the image forming apparatus 1 according to the present embodiment calculates the interval between the adjustment patterns T based on a theoretical speed of the carriage 6 and the adjustment pattern T that are relatively respectively moved by the movable-body drive unit formed of the main-scanning drive unit 104 and the main-scanning motor 10, and an arrival time interval from reading of an edge of a first adjustment pattern to reading of an edge of a second adjustment pattern or an arrival time interval from reading of a center of a first adjustment pattern to reading of a center position of the first adjustment pattern from a center position of the second adjustment pattern.

Accordingly, the image positional deviation adjustment process can be performed by obtaining the interval between the adjustment patterns T accurately and at a low cost, thereby enabling to improve accuracy of image positional deviation adjustment.

Furthermore, in the image forming apparatus 1 according to the present embodiment, the head-drive control unit 103 as an adjustment-pattern recording control unit causes the recording heads $20y$ to $20k$ to record a linear adjustment pattern T having a predetermined width and extending over a predetermined length in the sub-scanning direction with a predetermined angle as the adjustment pattern T.

Accordingly, the adjustment pattern T can be recorded easily and accurately, and accuracy of image positional deviation adjustment can be improved.

Further, in the image forming apparatus 1 according to the present embodiment, the reading sensor 30 irradiates the recording medium P with the read light spot Y having the spot diameter d of a predetermined size, and the head-drive control unit 103 causes the recording heads $20y$ to $20k$ to record the linear adjustment pattern T with a line width and the interval between the adjustment patterns T being equal to or larger than the spot diameter d of the read light spot Y.

Accordingly, even if a wrong positional deviation adjustment value is generated, by repeatedly performing the image positional deviation adjustment process, an error from the theoretical read-rate calculation value can be decreased, and the accuracy of image positional deviation adjustment can be improved.

Further, in the image forming apparatus 1 according to the present embodiment, the head-drive control unit 103 causes the recording heads $20y$ to $20k$ to record, as the adjustment patterns, the reference patterns Tk and the patterns to be measured Ts to be recorded with an equal interval, the pattern to be measured Ts being recorded under an ejection condition of the liquid droplet different from an ejection condition of the reference patterns Tk.

Accordingly, even if the positional deviation adjustment value is not correct, by repeatedly performing the image positional deviation adjustment process, an error from the theoretical read-rate calculation value can be decreased, and the accuracy of image positional deviation adjustment can be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
a conveying unit that conveys a recording medium;
a movable body that includes a recording head to eject a liquid droplet for image recording to the recording medium, and is supported movably in a main-scanning direction orthogonal to a conveying direction of the recording medium;
a movable-body drive unit that moves the movable body in the main-scanning direction;
an adjustment-pattern recording controller configured to cause a plurality of adjustment patterns to be recorded with a predetermined edge interval in the main-scanning direction by causing the liquid droplet ejected from the recording head to land on the recording medium, while causing the movable-body drive unit to move the movable body in the main-scanning direction;
a reading unit that is mounted on the movable body to irradiate the recording medium on which the adjustment patterns are recorded with read light and read the adjustment patterns by photoelectrically converting reflected light from the recording medium;
a calculator configured to calculate a positional deviation correction amount for correcting a deviation of a landing position of the liquid droplet, which is ejected from the recording head and landed on the recording medium, based on an ideal interval between the adjustment patterns recorded on the recording medium and a read result of the adjustment patterns read by the reading unit;
a correction unit configured to cause the adjustment-pattern recording controller to record the adjustment pattern at a recording position where the interval between the adjustment patterns becomes an integral multiple of a fluctuation cycle in a relative movement of the reading unit and the adjustment pattern, which is caused by movement of the movable body mounted with the reading unit, and correct the recording position of the adjustment pattern based on the positional deviation correction amount calculated by the calculator; and
an ejection timing adjustment unit configured to adjust an ejection timing of the liquid droplet by the recording head by performing repeatedly at least twice a recording process of the adjustment pattern on the recording medium by the adjustment-pattern recording controller, a reading process of the adjustment patterns by the reading unit, a calculation process of the positional deviation correction amount by the calculator, and a correction process of the recording position of the adjustment pattern by the correction unit.

2. The image forming apparatus according to claim 1, wherein the calculator calculates the interval between the adjustment patterns based on a theoretical speed of the movable body and the adjustment pattern that are relatively respectively moved by the movable-body drive unit and the conveying unit, and an arrival time interval from reading of an edge of a first adjustment pattern to reading of an edge of a second adjustment pattern or an arrival time interval from reading of a center of the first adjustment pattern to reading of a center position of the first adjustment pattern from a center position of the second adjustment pattern.

3. The image forming apparatus according to claim 2, wherein the adjustment-pattern recording controller causes the recording head to record, as the adjustment pattern, a linear adjustment pattern having a predetermined width and extending over a predetermined length in a sub-scanning direction with a predetermined angle.

4. The image forming apparatus according to claim 3, wherein
the reading unit irradiates the recording medium with the read light having a spot diameter of a predetermined size, and
the adjustment-pattern recording controller causes the recording head to record the linear adjustment patterns with a line width and a pattern interval being equal to or larger than the spot diameter of the read light.

5. The image forming apparatus according to claim 1, wherein the adjustment-pattern recording controller causes the recording head to record, as the adjustment patterns, reference patterns and patterns to be measured to be recorded with an equal interval, the patterns to be measured being recorded under an ejection condition of the liquid droplet different from an ejection condition of the reference patterns.

6. A method of adjusting an image positional deviation, comprising:
conveying a recording medium;
moving a movable body in a main-scanning direction orthogonal to a conveying direction of the recording medium, the movable body including a recording head to eject a liquid droplet for image recording to the recording medium and being supported movably in the main-scanning direction;
recording a plurality of adjustment patterns with a predetermined edge interval in the main-scanning direction by causing the liquid droplet ejected from the recording head to land on the recording medium, while moving the movable body in the main-scanning direction;
reading, by a reading unit mounted on the movable body, the adjustment patterns by irradiating the recording medium on which the adjustment patterns are recorded with read light and photoelectrically converting reflected light from the recording medium;
calculating a positional deviation correction amount for correcting a deviation of a landing position of the liquid droplet, which is ejected from the recording head and landed on the recording medium, based on an ideal interval between the adjustment patterns recorded on the recording medium and a read result of the adjustment patterns read at the reading;
correcting that includes recording the adjustment pattern at a recording position where the interval between the adjustment patterns becomes an integral multiple of a fluctuation cycle in a relative movement of the reading unit and the adjustment pattern, which is caused by movement of the movable body mounted with the reading unit, and correcting the recording position of the adjustment pattern based on the positional deviation correction amount calculated at the calculating; and
adjusting an ejection timing of the liquid droplet by the recording head by performing repeatedly at least twice the recording, the reading, the calculating, and the correcting.

7. A computer program product comprising a non-transitory computer-readable medium containing a computer program for adjusting an image positional deviation, the program causing a computer to perform:
causing a recording medium to be conveyed;
causing a movable body to be moved in a main-scanning direction orthogonal to a conveying direction of the recording medium, the movable body including a recording head to eject a liquid droplet for image recording to the recording medium and being supported movably in the main-scanning direction;
causing a plurality of adjustment patterns to be recorded with a predetermined edge interval in the main-scanning direction by causing the liquid droplet ejected from the recording head to land on the recording medium, while causing the movable body to be moved in the main-scanning direction;
causing a reading unit mounted on the movable body to read the adjustment patterns by causing the recording medium on which the adjustment patterns are recorded to be irradiated with read light and photoelectrically converting reflected light from the recording medium;
calculating a positional deviation correction amount for correcting a deviation of a landing position of the liquid droplet, which is ejected from the recording head and landed on the recording medium, based on an ideal interval between the adjustment patterns recorded on the recording medium and a read result of the adjustment patterns read at the reading;
correcting that includes recording the adjustment pattern at a recording position where the interval between the adjustment patterns becomes an integral multiple of a fluctuation cycle in a relative movement of the reading unit and the adjustment pattern, which is caused by movement of the movable body mounted with the reading unit, and correcting the recording position of the adjustment pattern based on the positional deviation correction amount calculated at the calculating; and
adjusting an ejection timing of the liquid droplet by the recording head by performing repeatedly at least twice the recording, the reading, the calculating, and the correcting.

* * * * *